(12) United States Patent
Watarai

(10) Patent No.: US 9,682,744 B2
(45) Date of Patent: Jun. 20, 2017

(54) BICYCLE SHIFTING CONTROL APPARATUS

(71) Applicant: SHIMANO INC., Sakai (JP)

(72) Inventor: Etsuyoshi Watarai, Sakai (JP)

(73) Assignee: SHIMANO INC., Sakai (JP)

( * ) Notice: Subject to any disclaimer, the term of this patent is extended or adjusted under 35 U.S.C. 154(b) by 321 days.

(21) Appl. No.: 14/447,530

(22) Filed: Jul. 30, 2014

(65) Prior Publication Data

US 2016/0031526 A1     Feb. 4, 2016

(51) Int. Cl.
*B62M 25/08*     (2006.01)
*F16H 61/662*     (2006.01)

(52) U.S. Cl.
CPC ....... *B62M 25/08* (2013.01); *F16H 61/66236* (2013.01)

(58) Field of Classification Search
None
See application file for complete search history.

(56) References Cited

U.S. PATENT DOCUMENTS

| 2003/0109976 | A1* | 6/2003 | Chien | B62M 1/00 701/51 |
| 2014/0121922 | A1* | 5/2014 | Vasiliotis | B62M 11/16 701/60 |

* cited by examiner

*Primary Examiner* — Edwin A Young
(74) *Attorney, Agent, or Firm* — Mori & Ward, LLP

(57) ABSTRACT

A bicycle shifting control apparatus comprises a transmission controller and a speed changing part. The transmission controller is configured to control a bicycle transmission with an operating speed. The speed changing part is configured to change the operating speed of the bicycle transmission based on input information.

19 Claims, 23 Drawing Sheets

BICYCLE SHIFTING CONTROL APPARATUS

BACKGROUND OF THE INVENTION

Field of the Invention

The present invention relates to a bicycle shifting control apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle transmission configured to be electrically operated. Such bicycle transmissions are configured to change a gear position in response to gear shift commands from electric operating devices.

SUMMARY OF THE INVENTION

In accordance with a first aspect of the present invention, a bicycle shifting control apparatus comprises a transmission controller and a speed changing part. The transmission controller is configured to control a bicycle transmission with an operating speed. The speed changing part is configured to change the operating speed of the bicycle transmission based on input information.

In accordance with a second aspect of the present invention, the bicycle shifting control apparatus according to the first aspect further comprises a sensing device configured to sense a pedaling state of a bicycle as the input information. The speed changing part is configured to change the operating speed of the bicycle transmission based on the pedaling state sensed by the sensing device.

In accordance with a third aspect of the present invention, the bicycle shifting control apparatus according to the second aspect is configured so that the sensing device comprises a cadence sensor configured to sense a cadence of the bicycle. The speed changing part is configured to change the operating speed of the bicycle transmission based on the cadence sensed by the cadence sensor.

In accordance with a fourth aspect of the present invention, the bicycle shifting control apparatus according to the second aspect is configured so that the sensing device comprises a power sensor configured to sense a pedaling power applied to a crank assembly of the bicycle. The speed changing part is configured to change the operating speed of the bicycle transmission based on the pedaling power sensed by the power sensor.

In accordance with a fifth aspect of the present invention, the bicycle shifting control apparatus according to the first aspect is configured so that the speed changing part includes an operating-speed receiving part configured to receive an input operating speed as the input information from an input device. The speed changing part is configured to change the operating speed of the bicycle transmission based on the input operating speed received by the operating-speed receiving part.

In accordance with a sixth aspect of the present invention, a bicycle shifting control apparatus comprises a transmission controller, a sensing device, and a speed changing part. The transmission controller is configured to control a bicycle transmission with an operating speed and a response speed. The sensing device is configured to sense a pedaling state of a bicycle. The speed changing part is configured to change one of the operating speed and the response speed based on the pedaling state sensed by the sensing device.

In accordance with a seventh aspect of the present invention, the bicycle shifting control apparatus according to the sixth aspect is configured so that the sensing device comprises a cadence sensor configured to sense a cadence of the bicycle. The speed changing part is configured to change the operating speed of the bicycle transmission based on the cadence sensed by the cadence sensor.

In accordance with an eighth aspect of the present invention, the bicycle shifting control apparatus according to the seventh aspect is configured so that the speed changing part decreases the operating speed of the bicycle transmission if the cadence sensed by the cadence sensor is lower than a cadence threshold.

In accordance with a ninth aspect of the present invention, the bicycle shifting control apparatus according to the sixth aspect is configured so that the sensing device comprises a power sensor configured to sense a pedaling power applied to a crank assembly of the bicycle. The speed changing part is configured to change the operating speed of the bicycle transmission based on the pedaling power sensed by the power sensor.

In accordance with a tenth aspect of the present invention, the bicycle shifting control apparatus according to the ninth aspect is configured so that the speed changing part decreases the operating speed of the bicycle transmission if the pedaling power sensed by the power sensor is higher than a power threshold.

In accordance with an eleventh aspect of the present invention, the bicycle shifting control apparatus according to the sixth aspect is configured so that the transmission controller is configured to control the bicycle transmission to continuously change a current gear position among a plurality of gear positions based on a shifting signal which has a signal duration and which is output from a shifter.

In accordance with a twelfth aspect of the present invention, the bicycle shifting control apparatus according to the eleventh aspect is configured so that the response speed of the bicycle transmission comprises a determination interval. The transmission controller includes a determination part and a command generator. The determination part is configured to determine at the determination interval whether the shifting signal is continuous. The command generator is configured to output a shifting command to the bicycle transmission at the determination interval if the determination part determines at the determination interval that the shifting signal is continuous.

In accordance with a thirteenth aspect of the present invention, the bicycle shifting control apparatus according to the twelfth aspect is configured so that the sensing device comprises a cadence sensor configured to sense a cadence of the bicycle. The speed changing part is configured to change the determination interval based on the cadence sensed by the cadence sensor.

In accordance with a fourteenth aspect of the present invention, the bicycle shifting control apparatus according to the thirteenth aspect is configured so that the speed changing part increases the determination interval if the cadence sensed by the cadence sensor is lower than a cadence threshold.

In accordance with a fifteenth aspect of the present invention, the bicycle shifting control apparatus according to the twelfth aspect is configured so that the sensing device comprises a power sensor configured to sense a pedaling power applied to a crank assembly of the bicycle. The speed changing part is configured to change the determination interval based on the pedaling power sensed by the power sensor.

In accordance with a sixteenth aspect of the present invention, the bicycle shifting control apparatus according to the fifteenth aspect is configured so that the speed changing part increases the determination interval if the pedaling power sensed by the power sensor is higher than a power threshold.

In accordance with a seventeenth aspect of the present invention, a bicycle shifting control apparatus comprises a sensing device and a transmission controller. The sensing device is configured to sense a pedaling state of a bicycle. The transmission controller is configured to control a bicycle transmission to continuously change a current gear position among a plurality of gear positions based on a shifting signal which has a signal duration and which is output from a shifter. The transmission controller includes a restricting part configured to restrict the bicycle transmission from continuously changing the current gear position based on the pedaling state sensed by the sensing device.

In accordance with an eighteenth aspect of the present invention, the bicycle shifting control apparatus according to the seventeenth aspect is configured so that the sensing device comprises a cadence sensor configured to sense a cadence of the bicycle. The restricting part is configured to restrict the bicycle transmission from continuously changing the current gear position if the cadence sensed by the cadence sensor is lower than a cadence threshold.

In accordance with a nineteenth aspect of the present invention, the bicycle shifting control apparatus according to the seventeenth aspect is configured so that the sensing device comprises a power sensor configured to sense a pedaling power applied to a crank assembly of the bicycle. The restricting part is configured to restrict the bicycle transmission from continuously changing the current gear position if the pedaling power sensed by the power sensor is higher than a power threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
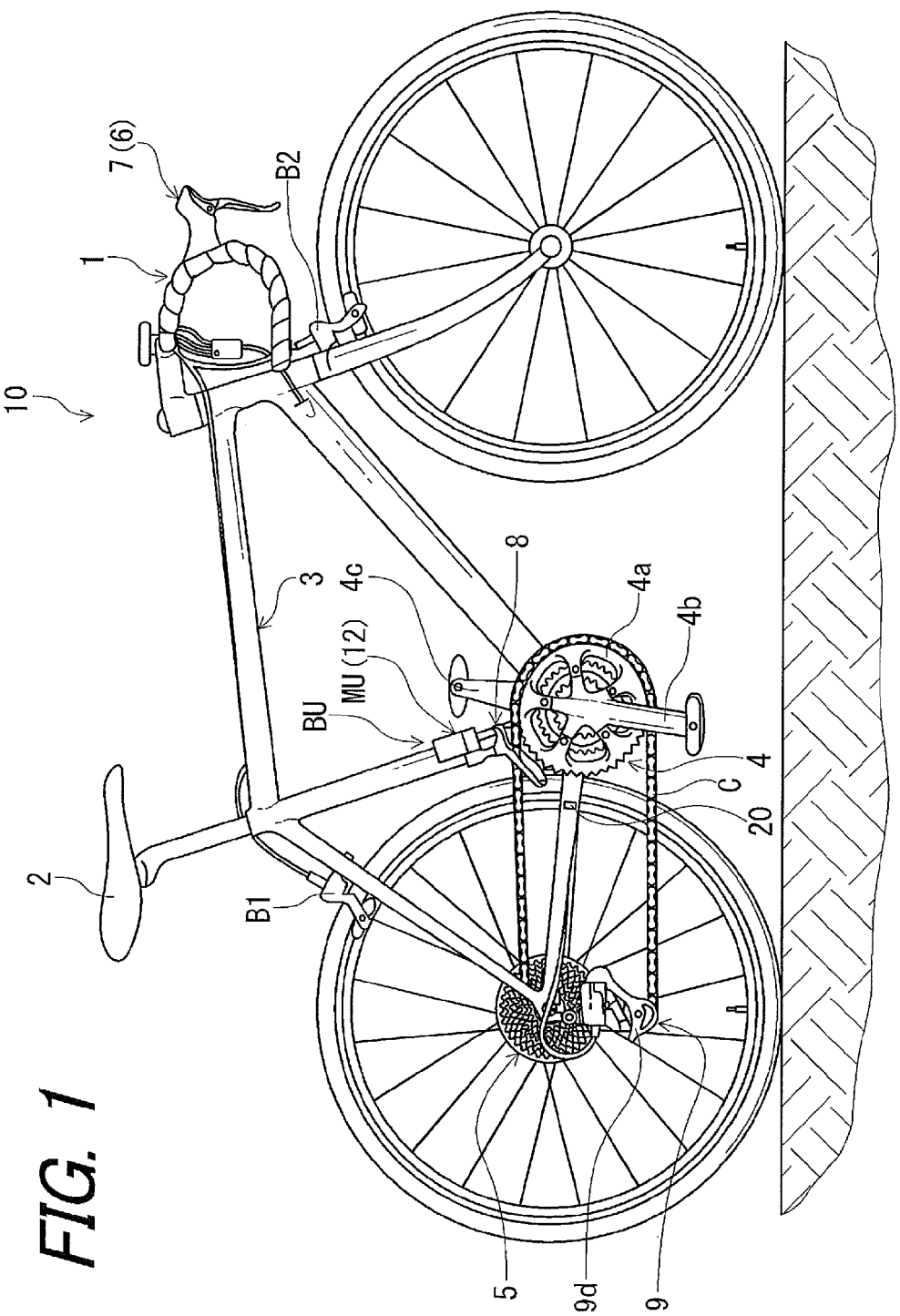
FIG. 1 is a side elevational view of a bicycle provided with a bicycle shifting control apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle shifting control apparatus 12 in accordance with a first embodiment. While the bicycle 10 is illustrated as a road bike, the bicycle shifting control apparatus 12 can be applied to mountain bikes or any type of bicycle.

As seen in FIG. 1, the bicycle 10 includes a handlebar 1, a saddle 2, a bicycle frame 3, a crank assembly 4, a rear sprocket assembly 5, a front shifter 6, a rear shifter 7, an electric (motorized) front derailleur 8, and an electric (motorized) rear derailleur 9. A bicycle chain C engages with a chain wheel 4a of the crank assembly 4 and the rear sprocket assembly 5. The electric front derailleur 8 is configured to shift the bicycle chain C between a plurality of front gear positions in response to operation of the front shifter 6. The electric rear derailleur 9 is configured to shift the bicycle chain C between a plurality of rear gear positions in response to operation of the rear shifter 7. The front shifter 6 is integrated in a left-side operating device via which a user operates a rear braking device B1. The rear shifter 7 is integrated in a right-side operating device via which a user operates a front braking device B2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle 2 of a bicycle with facing the handlebar 1. Accordingly, these terms, as utilized to describe the bicycle shifting control apparatus 12, should be interpreted relative to the bicycle 10 equipped with the bicycle shifting control apparatus 12 as used in an upright riding position on a horizontal surface.

The bicycle 10 includes a battery unit BU and a master unit MU. The battery unit BU and the master unit MU are mounted on the bicycle frame 3. The battery unit BU is configured to supply electrical power to several electric components such as the master unit MU, the electric front derailleur 8, and the electric rear derailleur 9. The master unit MU is configured to control several electric components. In the illustrated embodiment, the bicycle shifting control apparatus 12 is mounted in the master unit MU. However, the bicycle shifting control apparatus 12 can be at least partially mounted in other electric components such as the front shifter 6, the rear shifter 7, the electric front derailleur 8, and the electric rear derailleur 9 if needed and/or desired.

In the illustrated embodiment, the bicycle shifting control apparatus 12 will be described below in detail using the rear shifter 7 and the electric rear derailleur 9 as a shifter and a bicycle transmission. The rear shifter 7 can be hereinafter referred to as a shifter 7. The electric rear derailleur 9 can be hereinafter referred to as the bicycle transmission 9.

Possible examples of the bicycle transmission include a derailleur (such as the electric front derailleur 8 or the electric rear derailleur 9) and an internal-gear hub. However, the configurations of the bicycle shifting control apparatus 12 can be applied to other bicycle transmissions such as the electric front derailleur 8 or the internal-gear hub.

Figure 2:
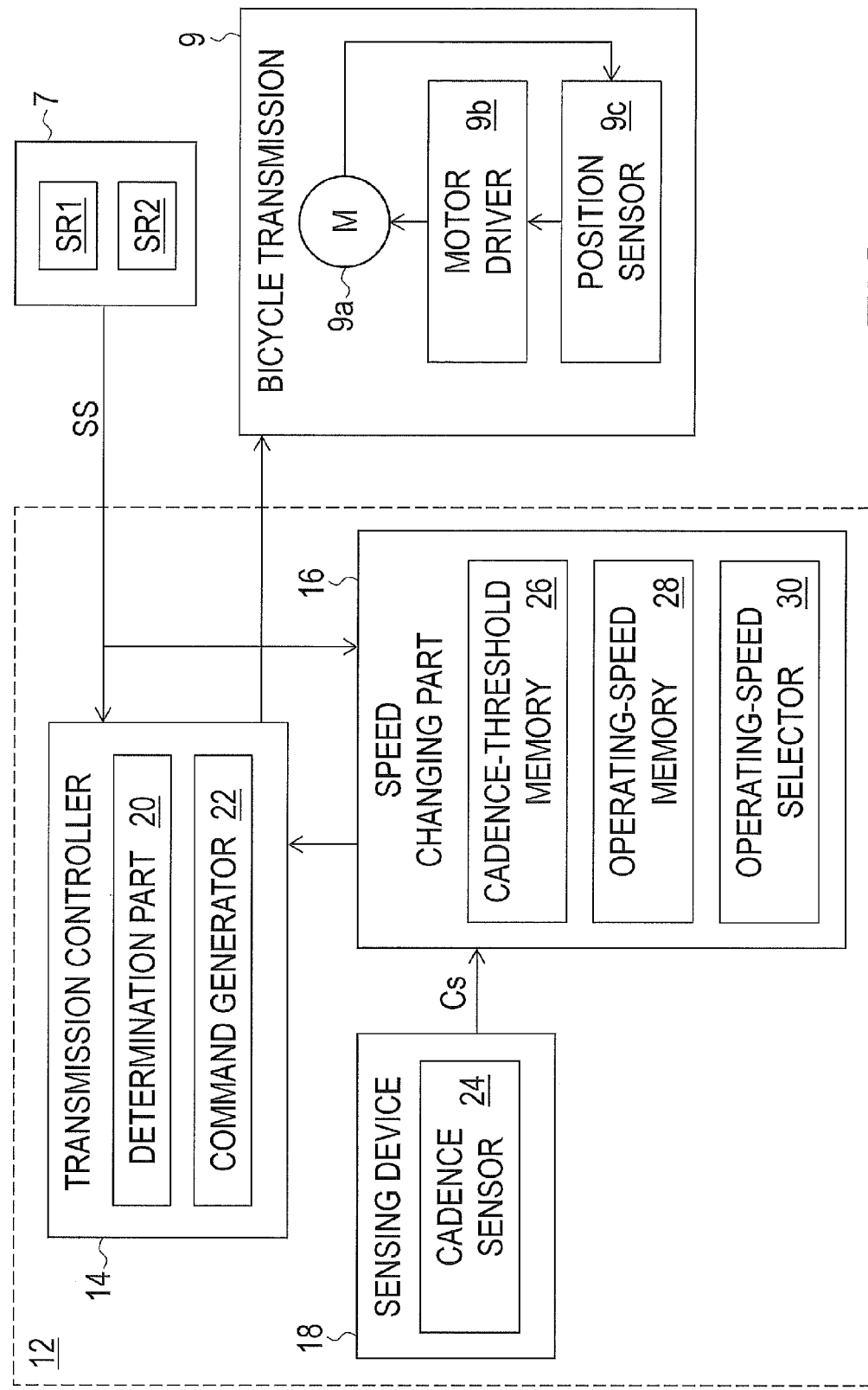
FIG. 2 is a block diagram of the bicycle shifting control apparatus illustrated in FIG. 1.

As seen in FIG. 2, the bicycle shifting control apparatus 12 comprises a transmission controller 14 configured to control the bicycle transmission 9 with an operating speed. More specifically, the transmission controller 14 is configured to control the bicycle transmission 9 with the operating speed and a response speed.

The bicycle transmission 9 includes a motor 9a, a motor driver 9b, and a position sensor 9c. The motor 9a is configured to move a chain guide 9d (FIG. 1) in a transverse direction of the bicycle 10. For example, the operating speed is a speed with which the motor 9a moves the chain guide 9d. The motor driver 9b is configured to control the motor 9a based on commands and/or signals from the transmission controller 14 and the speed changing part 16. The position sensor 9c is configured to sense a current gear position of the bicycle transmission 9.

As seen in FIG. 2, the shifter 7 includes a first operating member SR1 and a second operating member SR2. The first operating member SR1 is configured to be operated by a user for upshifting. The second operating member SR2 is configured to be operated by the user for the downshifting.

Figure 3:
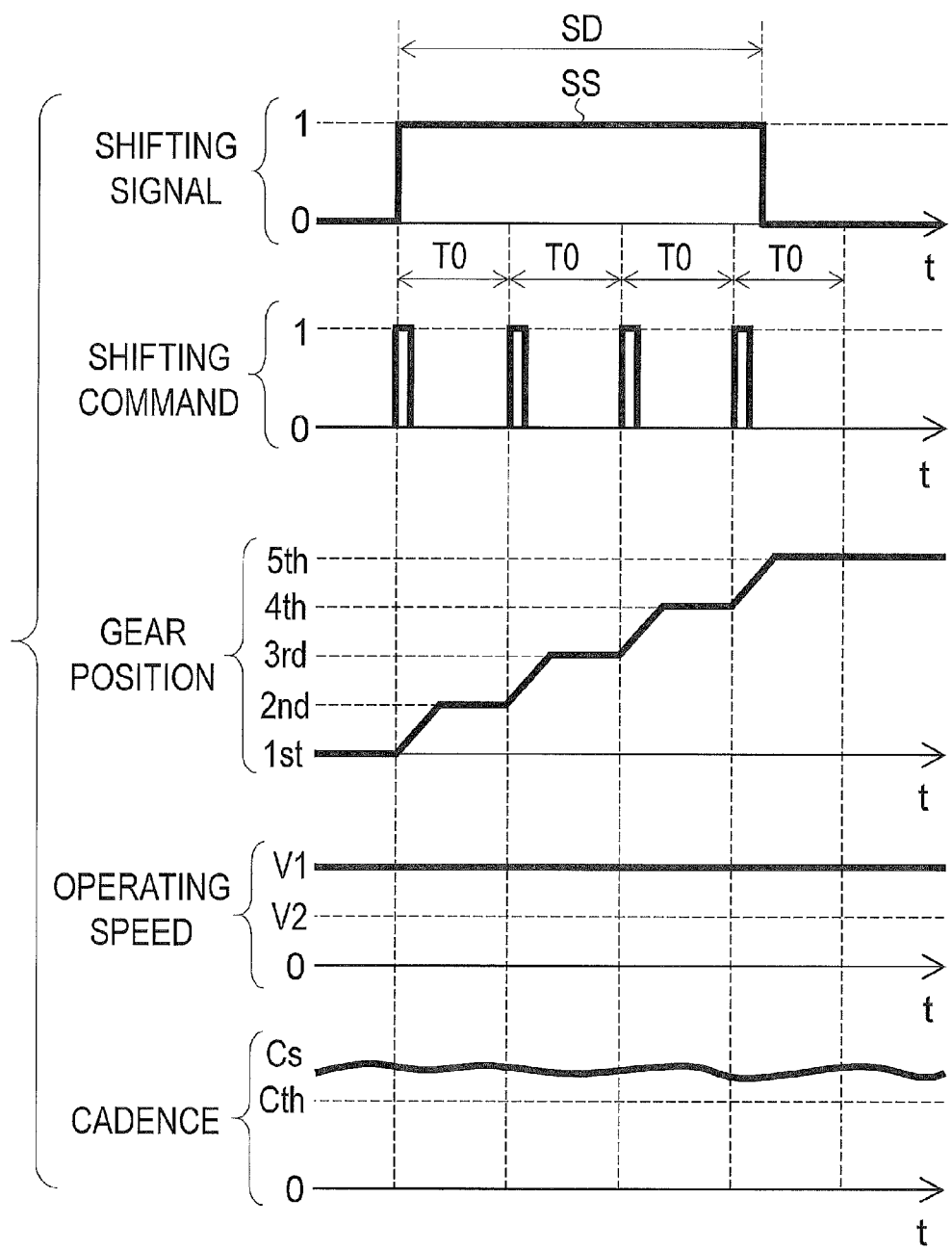
FIG. 3 is a timing chart showing an operation of the bicycle shifting control apparatus illustrated in FIG. 1.

As seen in FIG. 3, the shifter 7 is configured to output a shifting signal SS having a signal duration SD corresponding to an operating time of each of the first operating member SR1 and the second operating member SR2.

As seen in FIG. 2, the transmission controller 14 is configured to control the bicycle transmission 9 to continuously change a current gear position among a plurality of gear positions based on the shifting signal SS which has the signal duration SD (FIG. 3) and which is output from the shifter 7. In the illustrated embodiment, the transmission controller 14 is configured to control the electric rear derailleur 9 to continuously shift the bicycle chain C (FIG. 1) among a plurality of gear positions based on the shifting signal SS having the signal duration SD (FIG. 3).

For example, the transmission controller 14 is configured to control the bicycle transmission 9 to continuously change a current gear position among a plurality of gear positions based on the shifting signal SS, the signal duration SD, and the response speed. In the illustrated embodiment, as seen in FIG. 3, the response speed of the bicycle transmission 9 comprises a determination interval T0.

As seen in FIG. 2, the transmission controller 14 includes a determination part 20 and a command generator 22. As seen in FIG. 3, the determination part 20 is configured to determine at the determination interval T0 whether the shifting signal SS is continuous. The command generator 22 is configured to output a shifting command to the bicycle transmission 9 at the determination interval T0 if the determination part 20 determines at the determination interval T0 that the shifting signal SS is continuous.

As seen in FIG. 3, the bicycle transmission 9 is configured to change a current gear position by one stage based on the shifting command from the command generator 22. In a case where the signal duration SD of the shifting signal SS is longer than the determination interval T0, the command generator 22 outputs a plurality of shifting commands to the bicycle transmission 9 in accordance with the signal duration SD.

As seen in FIG. 3, for example, in a case where the signal duration SD of the shifting signal SS has a length more than three times longer than the determination interval T0, the transmission controller 14 controls the bicycle transmission 9 to continuously change the current gear position by four stages based on the shifting signal SS and the signal duration SD.

More specifically, in a case where the bicycle transmission 9 upshifts the current gear position from a first gear, the command generator 22 outputs an upshifting command to the bicycle transmission 9 when the shifting signal SS is inputted from the shifter 7 to the transmission controller 14. The bicycle transmission 9 changes the current gear position from the first gear to a second gear in response to the upshifting command from the command generator 22.

As seen in FIG. 3, when the determination part 20 determines at the determination interval T0 that the shifting signal SS is continuous, the command generator 22 outputs an additional upshifting command to the bicycle transmission 9. The bicycle transmission 9 changes the current gear position from the second gear to a third gear in response to the additional upshifting command.

When the determination part 20 determines at the next determination interval T0 that the shifting signal SS is still continuous, the command generator 22 outputs an additional upshifting command to the bicycle transmission 9. The bicycle transmission 9 changes the current gear position from the third gear to a fourth gear in response to the additional upshifting command. The above operation is applied to the upshifting from the fourth gear to a fifth gear.

When the determination part 20 determines at the next determination interval T0 that the shifting signal SS is not continuous (that the shifting signal SS has been terminated), the command generator 22 does not output an additional upshifting command to the bicycle transmission 9.

As seen in FIG. 2, the bicycle shifting control apparatus 12 comprises a speed changing part 16 configured to change the operating speed of the bicycle transmission 9 based on input information. The bicycle shifting control apparatus 12 further comprises a sensing device 18 configured to sense a pedaling state of the bicycle 10 as the input information. The speed changing part 16 is configured to change the operating speed of the bicycle transmission 9 based on the pedaling state sensed by the sensing device 18.

The bicycle shifting control apparatus 12 is equipped with a central processing unit (CPU), a read only memory (ROM), and a random access memory (RAM). For example, a shifting control program stored in the ROM is read into the CPU to perform functions of each of the transmission controller 14 and the speed changing part 16.

As seen in FIG. 2, the sensing device 18 comprises a cadence sensor 24 configured to sense a cadence of the bicycle 10 as the pedaling state of the bicycle 10. As seen in FIG. 1, the cadence sensor 24 is attached to the bicycle frame 3. The cadence sensor 24 is configured to sense a rotational speed of a right crank arm 4b of the crank assembly 4 as the cadence.

As seen in FIG. 2, the speed changing part 16 is configured to change one of the operating speed and the response speed based on the pedaling state sensed by the sensing device 18. In the illustrated embodiment, the speed changing part 16 is configured to change the operating speed of the bicycle transmission 9 based on the cadence Cs sensed by the cadence sensor 24.

The speed changing part 16 decreases the operating speed of the bicycle transmission 9 if the cadence Cs sensed by the cadence sensor 24 is lower than a cadence threshold. The speed changing part 16 increases the operating speed of the bicycle transmission 9 if the cadence Cs sensed by the cadence sensor 24 is equal to or higher than the cadence threshold.

As seen in FIG. 2, the speed changing part 16 includes a cadence-threshold memory 26, an operating-speed memory 28, and an operating-speed selector 30. The cadence-threshold memory 26 is configured to store the cadence threshold. The operating-speed memory 28 is configured to store a plurality of predetermined operating speeds.

The operating-speed selector 30 is configured to select, as the operating speed, one of the predetermined operating speeds in accordance with the cadence Cs sensed by the cadence sensor 24. The operating-speed selector 30 is configured to output a selected operating speed to the transmission controller 14. The transmission controller 14 is configured to control the bicycle transmission 9 to change a gear position with the selected operating speed. More specifically, the transmission controller 14 is configured to output the selected operating speed as an operating speed command to the bicycle transmission 9. The motor driver 9b is configured to control the motor 9a to move with the selected operating speed.

In the illustrated embodiment, the operating-speed selector 30 is configured to select one of the predetermined operating speeds as the operating speed in accordance with the cadence Cs. However, the operating-speed selector 30 can be configured to continuously change the operating speed in accordance with the cadence Cs if needed and/or desired.

In the illustrated embodiment, the speed changing part 16 is configured to output the selected operating speed to the transmission controller 14. However, the speed changing part 16 can be configured to output the selected operating speed to the bicycle transmission 9 if needed and/or desired. In such an embodiment, the motor driver 9b and the position sensor 9c can be included in the transmission controller 14.

Figure 4:
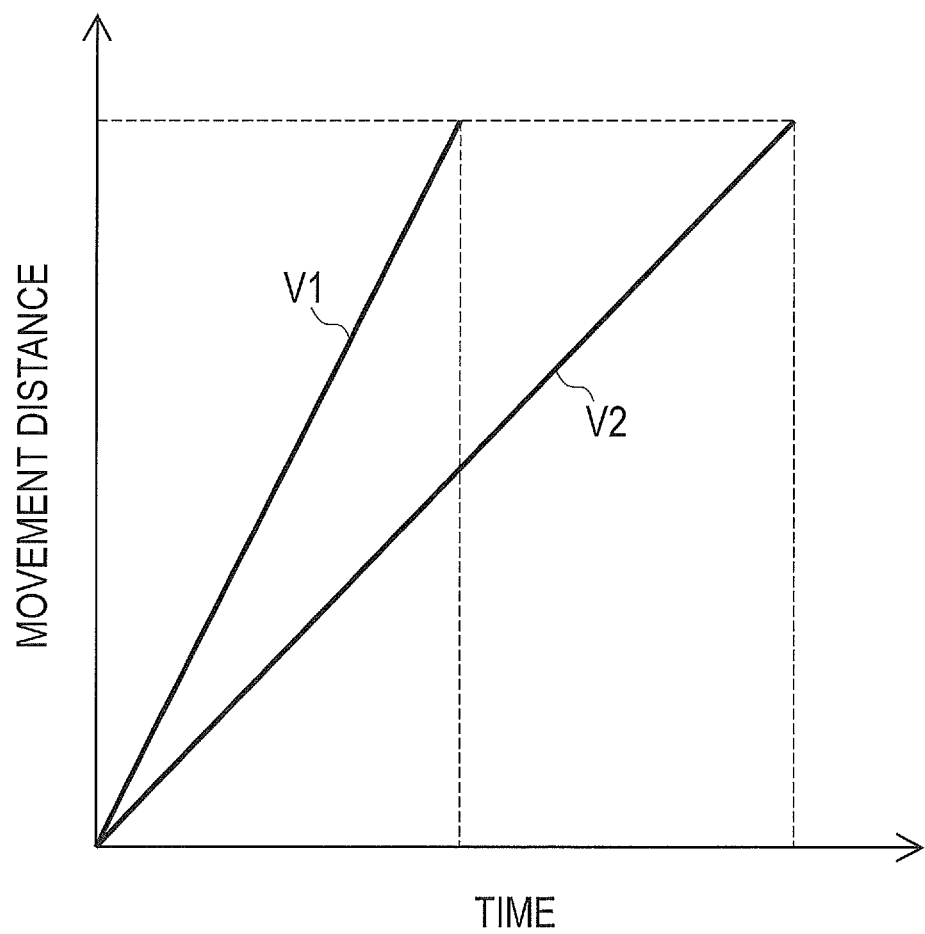
FIG. 4 is a graph showing operating speeds of a bicycle transmission illustrated in FIG. 1.

As seen in FIG. 4, for example, the operating-speed memory 28 is configured to store a first operating speed V1 and a second operating speed V2 different from the first operating speed V1. In the illustrated embodiment, the second operating speed V2 is lower than the first operating speed V1. For example, the first operating speed V1 is a normal operating speed of the bicycle transmission 9. The operating-speed memory 28 can be configured to store more than three operating speeds if needed and/or desired.

As seen in FIG. 3, the operating-speed selector 30 is configured to select the first operating speed V1 as the operating speed from among the first operating speed V1 and the second operating speed V2 if the cadence Cs sensed by the cadence sensor 24 is equal to or higher than the cadence threshold Cth. The operating-speed selector 30 outputs the first operating speed V1 to the transmission controller 14 as the operating speed when selecting the first operating speed V1. The transmission controller 14 controls the bicycle transmission 9 to change a current gear position with the first operating speed V1. More specifically, the transmission controller 14 outputs the first operating speed V1 as an operating speed command to the bicycle transmission 9. The motor driver 9b controls the motor 9a to move with the first operating speed V1 inputted from the transmission controller 14.

Figure 5:
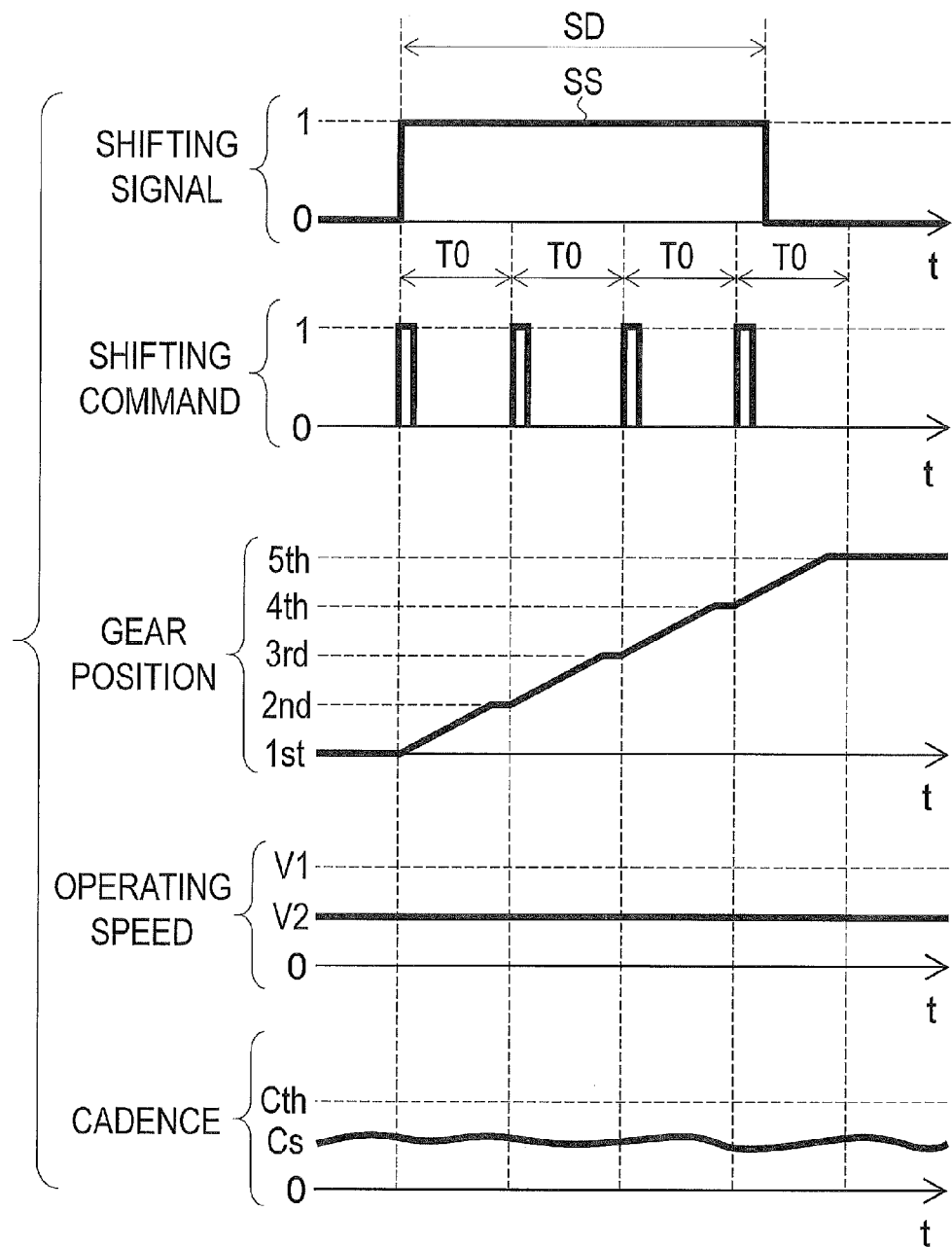
FIG. 5 is a timing chart showing the operation of the bicycle shifting control apparatus illustrated in FIG. 1.

As seen in FIG. 5, the operating-speed selector 30 is configured to select the second operating speed V2 as the operating speed from among the first operating speed V1 and the second operating speed V2 if the cadence Cs sensed by the cadence sensor 24 is lower than the cadence threshold Cth. The operating-speed selector 30 outputs the second operating speed V2 to the transmission controller 14 as the operating speed when selecting the second operating speed V2. The transmission controller 14 controls the bicycle transmission 9 to change a current gear position with the second operating speed V2. More specifically, the transmission controller 14 outputs the second operating speed V2 as an operating speed command to the bicycle transmission 9. The motor driver 9b controls the motor 9a to move with the second operating speed V2 inputted from the transmission controller 14.

With the bicycle shifting control apparatus 12, the speed changing part 16 is configured to change the operating speed of the bicycle transmission 9 based on the input information. Accordingly, it is possible to change the operating speed of the bicycle transmission 9 in accordance with the condition of the bicycle 10.

Second Embodiment

A bicycle shifting control apparatus 212 in accordance with a second embodiment will be described below referring to FIGS. 6 to 8. The bicycle shifting control apparatus 212 has the same configuration as the bicycle shifting control apparatus 12 except for the sensing device and the speed changing part. Thus, elements having substantially the same function as those in the first embodiment will be numbered the same here, and will not be described and/or illustrated again in detail here for the sake of brevity.

Figure 6:
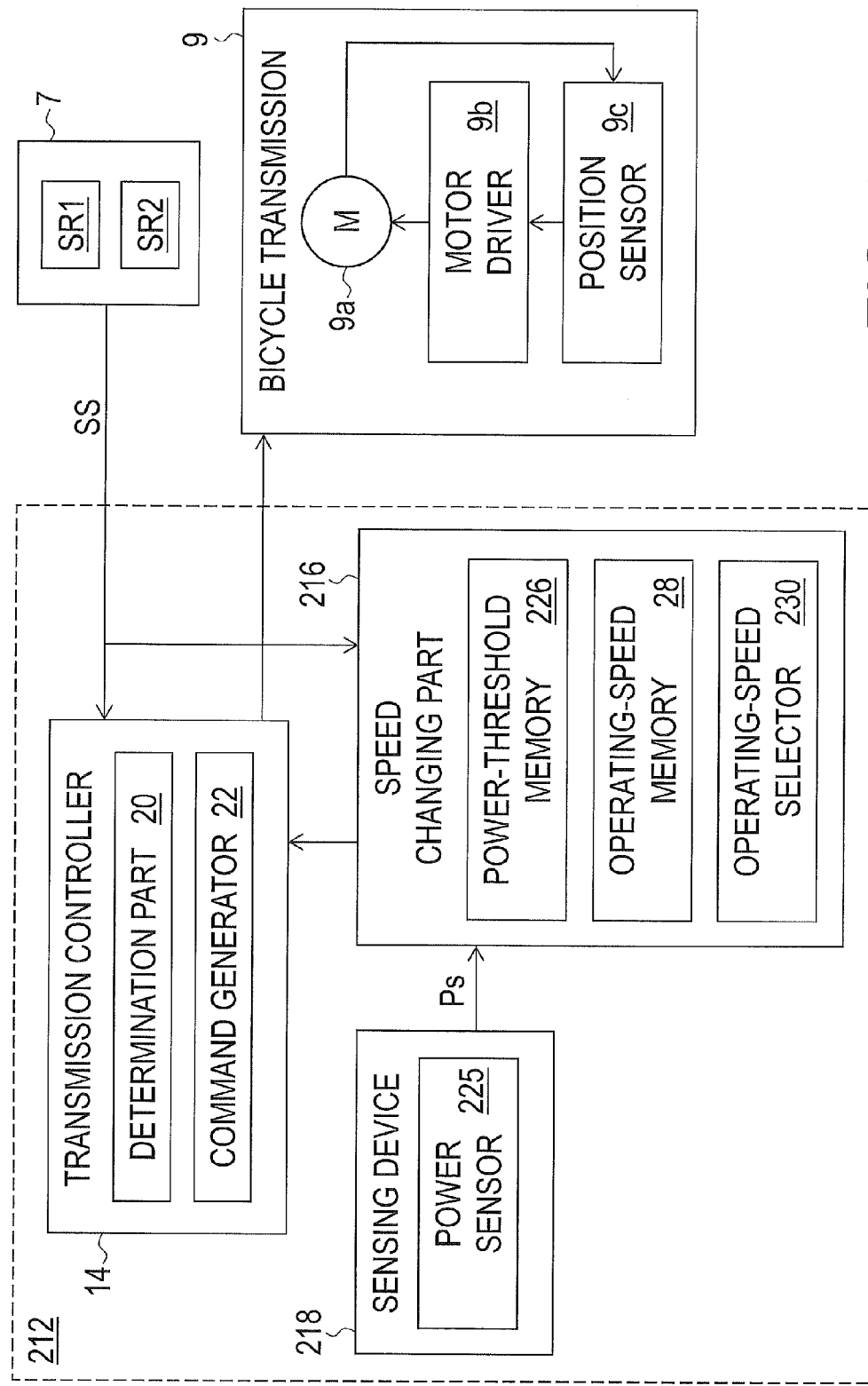
FIG. 6 is a block diagram of a bicycle shifting control apparatus in accordance with a second embodiment.

As seen in FIG. 6, the bicycle shifting control apparatus 212 comprises a speed changing part 216 configured to change the operating speed of the bicycle transmission 9 based on input information. The bicycle shifting control apparatus 212 further comprises a sensing device 218 configured to sense a pedaling state of the bicycle 10 as the input information. The sensing device 218 comprises a power sensor 225 instead of the cadence sensor 24. The power sensor 225 is configured to sense a pedaling power applied to the crank assembly 4 of the bicycle 10. Unlike the speed changing part 16 in accordance with the first embodiment, the speed changing part 216 is configured to change the operating speed of the bicycle transmission 9 based on the pedaling power sensed by the power sensor 225.

Possible examples of the pedaling power include torque applied to the crank assembly 4 and strain of at least one of the right crank arm 4b, a left crank arm 4c and a crank shaft (not shown) connecting the right crank arm 4b and the left crank arm 4c of the crank assembly 4 (FIG. 1). Possible examples of the power sensor 225 include a strain sensing unit configured to measure strain of at least one of the right crank arm 4b, the left crank arm 4c and the crank shaft of the crank assembly 4 (FIG. 1).

The speed changing part 216 decreases the operating speed of the bicycle transmission if the pedaling power sensed by the power sensor 225 is higher than a power threshold. The speed changing part 216 increases the operating speed of the bicycle transmission 9 if the pedaling power sensed by the power sensor 225 is equal to or lower than the power threshold. The speed changing part 216 includes a power-threshold memory 226 instead of the cadence-threshold memory 26. The power-threshold memory 226 is configured to store the power threshold.

The speed changing part 216 includes an operating-speed selector 230 configured to select, as the operating speed, one of the predetermined operating speeds in accordance with the pedaling power Ps sensed by the power sensor 225. The operating-speed selector 230 is configured to output a selected operating speed to the transmission controller 14. The transmission controller 14 is configured to control the bicycle transmission 9 to change a gear position with the selected operating speed. More specifically, the transmission controller 14 is configured to output the selected operating speed as an operating speed command to the bicycle transmission 9. The motor driver 9b is configured to control the motor 9a to move with the selected operating speed.

In the illustrated embodiment, the operating-speed selector 230 is configured to select one of the predetermined operating speeds as the operating speed in accordance with the pedaling power Ps. However, the operating-speed selector 230 can be configured to continuously change the operating speed in accordance with the pedaling power Ps if needed and/or desired.

In the illustrated embodiment, the speed changing part 216 is configured to output the selected operating speed to the transmission controller 14. However, the speed changing part 216 can be configured to output the selected operating speed to the bicycle transmission 9 if needed and/or desired. In such an embodiment, the motor driver 9b and the position sensor 9c can be included in the transmission controller 14.

Figure 7:
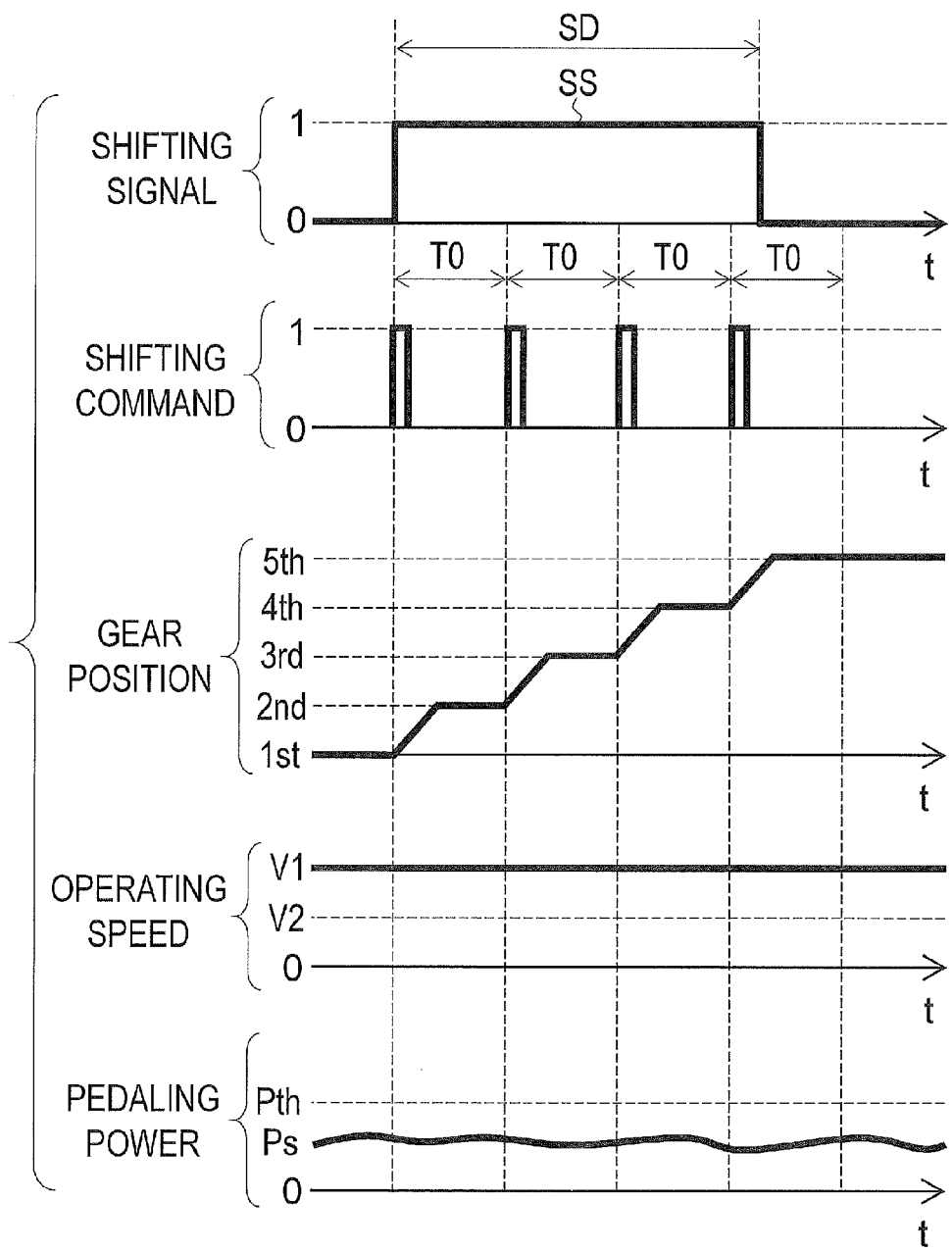
FIG. 7 is a timing chart showing an operation of the bicycle shifting control apparatus illustrated in FIG. 6.

As seen in FIG. 7, the operating-speed selector 230 is configured to select the first operating speed V1 as the operating speed from among the first operating speed V1 and the second operating speed V2 if the pedaling power Ps sensed by the power sensor 225 is equal to or lower than the power threshold Pth. The operating-speed selector 230 outputs the first operating speed V1 to the transmission controller 14 as the operating speed when selecting the first operating speed V1. The transmission controller 14 controls the bicycle transmission 9 to change a current gear position with the first operating speed V1.

Figure 8:
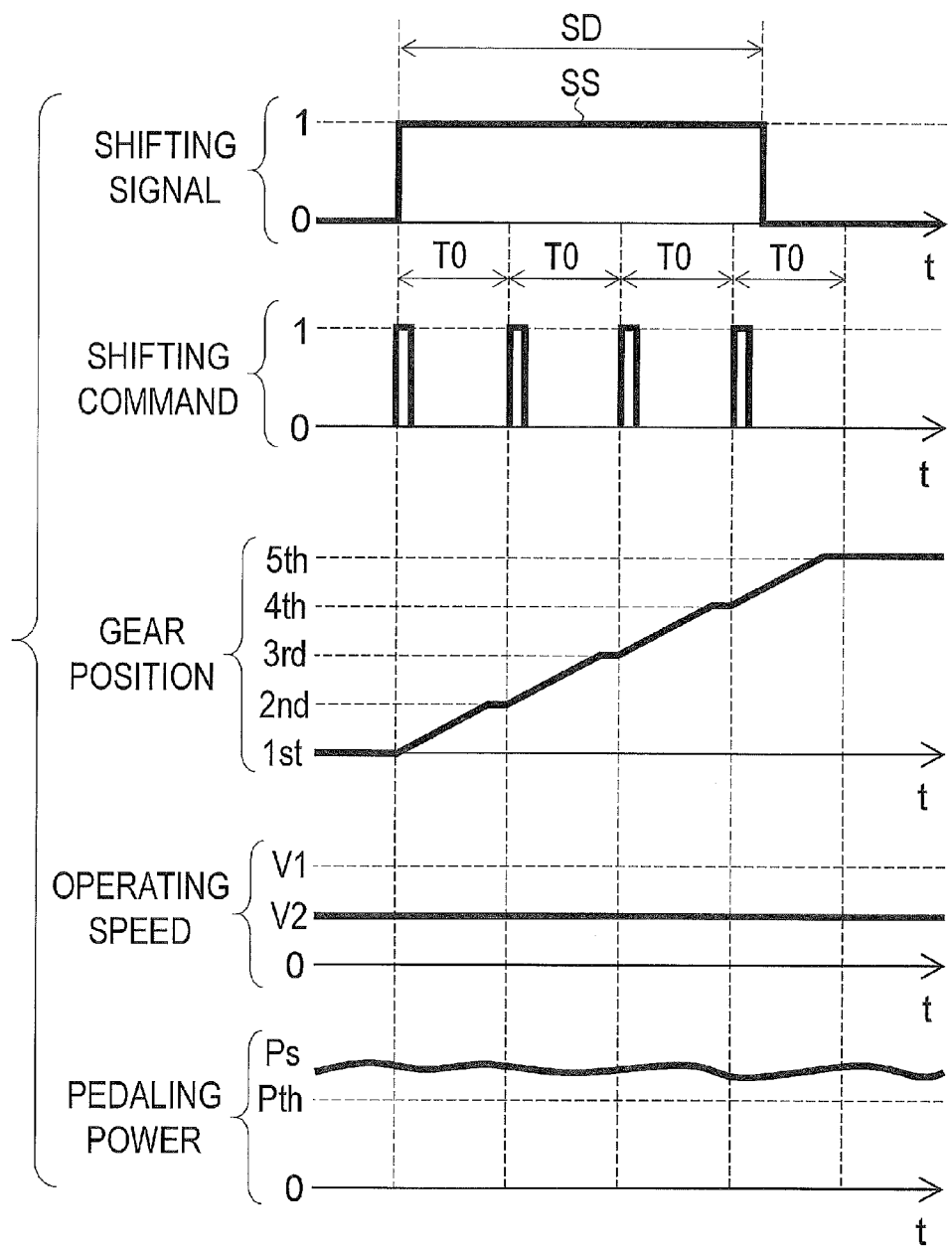
FIG. 8 is a timing chart showing the operation of the bicycle shifting control apparatus illustrated in FIG. 6.

As seen in FIG. 8, the operating-speed selector 230 of the speed changing part 216 is configured to select the second operating speed V2 as the operating speed from among the first operating speed V1 and the second operating speed V2 if the pedaling power Ps sensed by the power sensor 225 is higher than the power threshold Pth stored in the power-threshold memory 226. The operating-speed selector 230 outputs the second operating speed V2 to the transmission controller 14 as the operating speed when selecting the second operating speed V2. The transmission controller 14 controls the bicycle transmission 9 to change a current gear position with the second operating speed V2.

With the bicycle shifting control apparatus 212, the speed changing part 216 is configured to change the operating speed of the bicycle transmission 9 based on the input information. Accordingly, it is possible to change the operating speed of the bicycle transmission 9 in accordance with the condition of the bicycle as well as the bicycle shifting control apparatus 12 in accordance with the first embodiment.

Third Embodiment

A bicycle shifting control apparatus 312 in accordance with a third embodiment will be described below referring to FIG. 9. The bicycle shifting control apparatus 312 has the same configuration as the bicycle shifting control apparatus 12 except for the speed changing part and the sensing device. Thus, elements having substantially the same function as those in the above embodiments will be numbered the same here, and will not be described and/or illustrated again in detail here for the sake of brevity.

Figure 9:
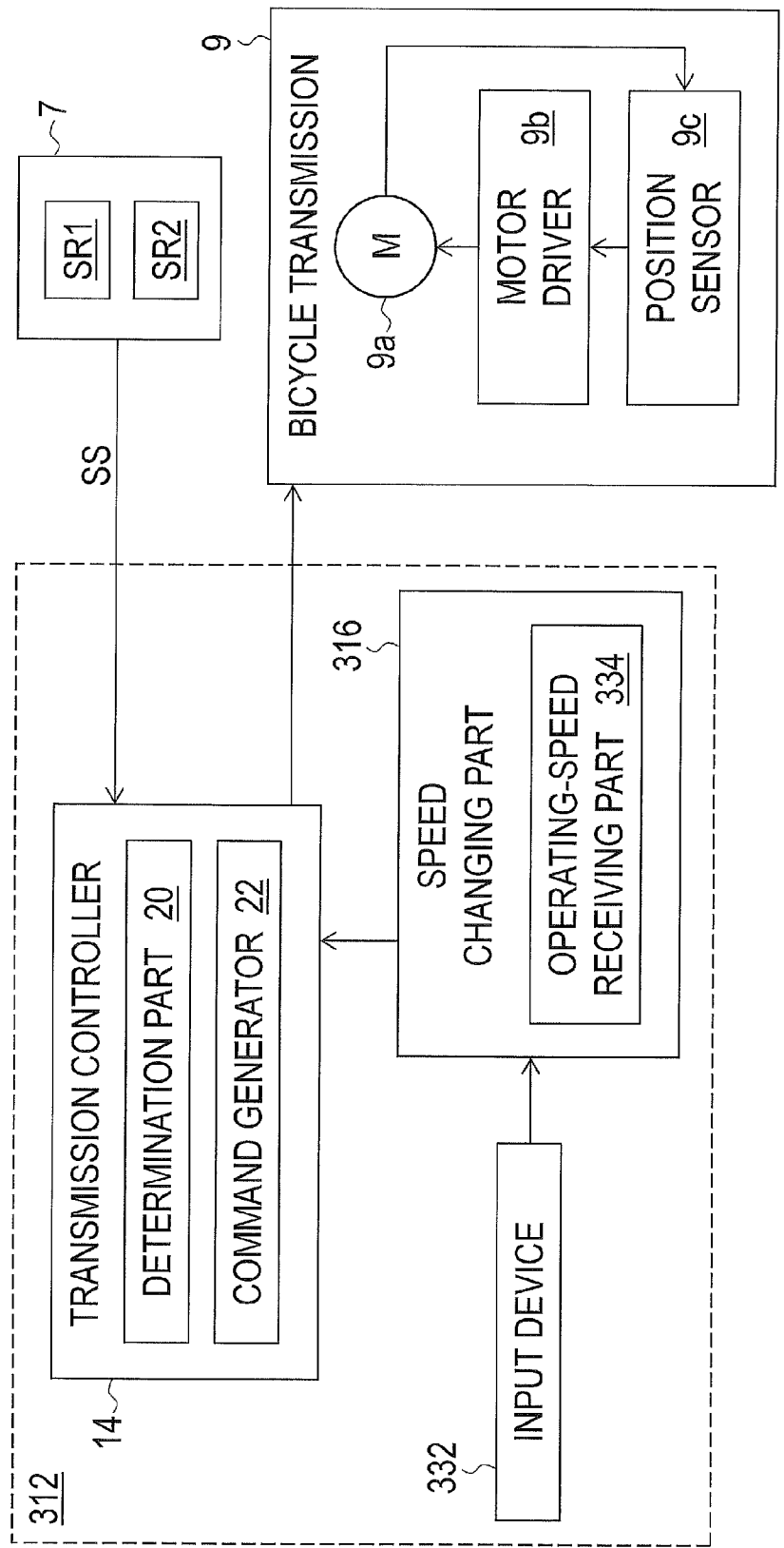
FIG. 9 is a block diagram of a bicycle shifting control apparatus in accordance with a third embodiment.

As seen in FIG. 9, the bicycle shifting control apparatus 312 comprises a speed changing part 316 configured to change the operating speed of the bicycle transmission 9 based on input information. In the illustrated embodiment, the bicycle shifting control apparatus 312 further comprises an input device 332 via which a user inputs the input operating speed. For example, the input device 332 is mounted on the handlebar 1(FIG. 1) and includes a select lever (not shown) with which the user can select the input operating speed from among a plurality of predetermined operating speeds.

The speed changing part 316 includes an operating-speed receiving part 334 configured to receive the input operating speed as the input information from the input device 332. The speed changing part 316 is configured to change the operating speed of the bicycle transmission 9 based on the input operating speed received by the operating-speed receiving part 334.

In the illustrated embodiment, the operating-speed receiving part 334 is configured to store the input operating speed inputted via the input device 332. The operating-speed receiving part 334 is configured to output the input operating speed to the transmission controller 14 as the operating speed. The transmission controller 14 is configured to control the bicycle transmission 9 to change a current gear position with the input operating speed. More specifically, the motor driver 9b is configured to control the motor 9a to move with the input operating speed outputted from the transmission controller 14. Namely, the bicycle shifting control apparatus 312 allows the user to manually change the operating speed of the bicycle transmission 9.

With the bicycle shifting control apparatus 312, the speed changing part 316 is configured to change the operating speed of the bicycle transmission 9 based on the input information. Accordingly, it is possible to change the operating speed of the bicycle transmission 9 in accordance with the condition of the bicycle as well as the bicycle shifting control apparatus 12 in accordance with the first embodiment.

In the third embodiment, the input device 332 is mounted on the handlebar 1 for inputting the operating speed. However, the input device 332 can have other configuration if needed and/or desired. For example, it is possible to input the input operating speed via software that allows a user to adjust the setting of the bicycle transmission. In such an embodiment, to input the operating speed into the bicycle transmission, the bicycle transmission or the master unit is connected with a computer (e.g., a personal computer) in which the software is installed. The user can input or select the operating speed using the computer. The operating-speed receiving part 334 is configured to receive the input operating speed as the input information from the computer. Namely, the input device 332 can be such a computer configured to adjust the setting of the bicycle transmission.

Fourth Embodiment

A bicycle shifting control apparatus 412 in accordance with a fourth embodiment will be described below referring to FIGS. 10 to 13. The bicycle shifting control apparatus 412 has the same configuration as the bicycle shifting control apparatus 12 except for the speed changing part. Thus, elements having substantially the same function as those in the above embodiments will be numbered the same here, and will not be described and/or illustrated again in detail here for the sake of brevity.

Figure 10:
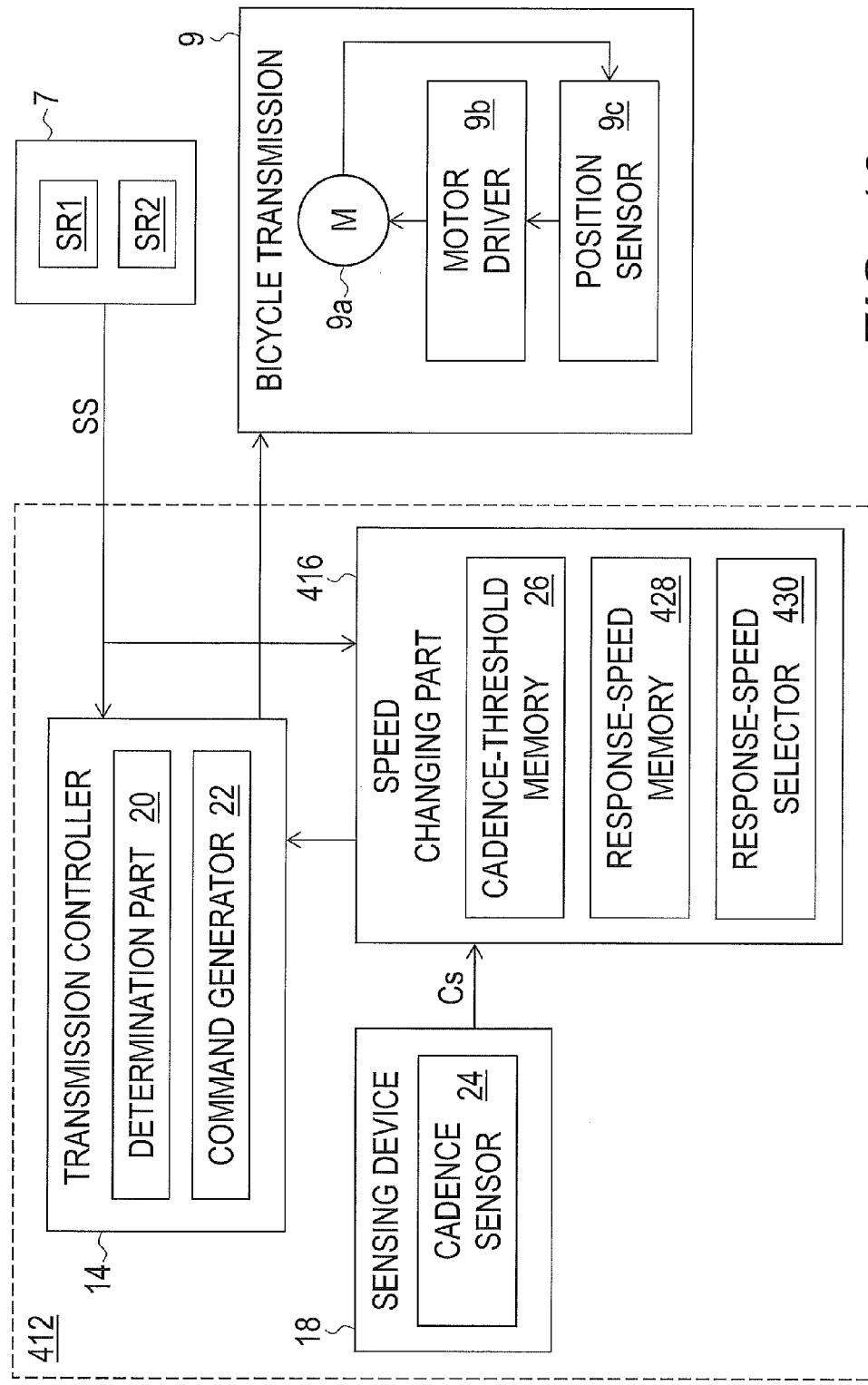
FIG. 10 is a block diagram of a bicycle shifting control apparatus in accordance with a fourth embodiment.

As seen in FIG. 10, the bicycle shifting control apparatus 412 comprises a speed changing part 416 configured to change one of the operating speed and the response speed based on the pedaling state sensed by the sensing device 18. In the illustrated embodiment, the speed changing part 416 is configured to change the determination interval based on the cadence Cs sensed by the cadence sensor 24. The speed changing part 416 is configured to output a changed determination interval to the transmission controller 14 as the response speed. The transmission controller 14 is configured to control the bicycle transmission 9 with the changed determination interval.

The speed changing part 416 increases the determination interval T0 if the cadence Cs sensed by the cadence sensor 24 is lower than the cadence threshold Cth. More specifically, the speed changing part 416 includes a response-speed memory 428 and a response-speed selector 430. The response-speed memory 428 is configured to store a plurality of stored determination intervals. The response-speed selector 430 is configured to select, as the determination interval, one of the stored determination intervals in accordance with the cadence Cs. The response-speed selector 430 is configured to output a selected determination interval to the transmission controller 14 as the response speed.

Figure 11:
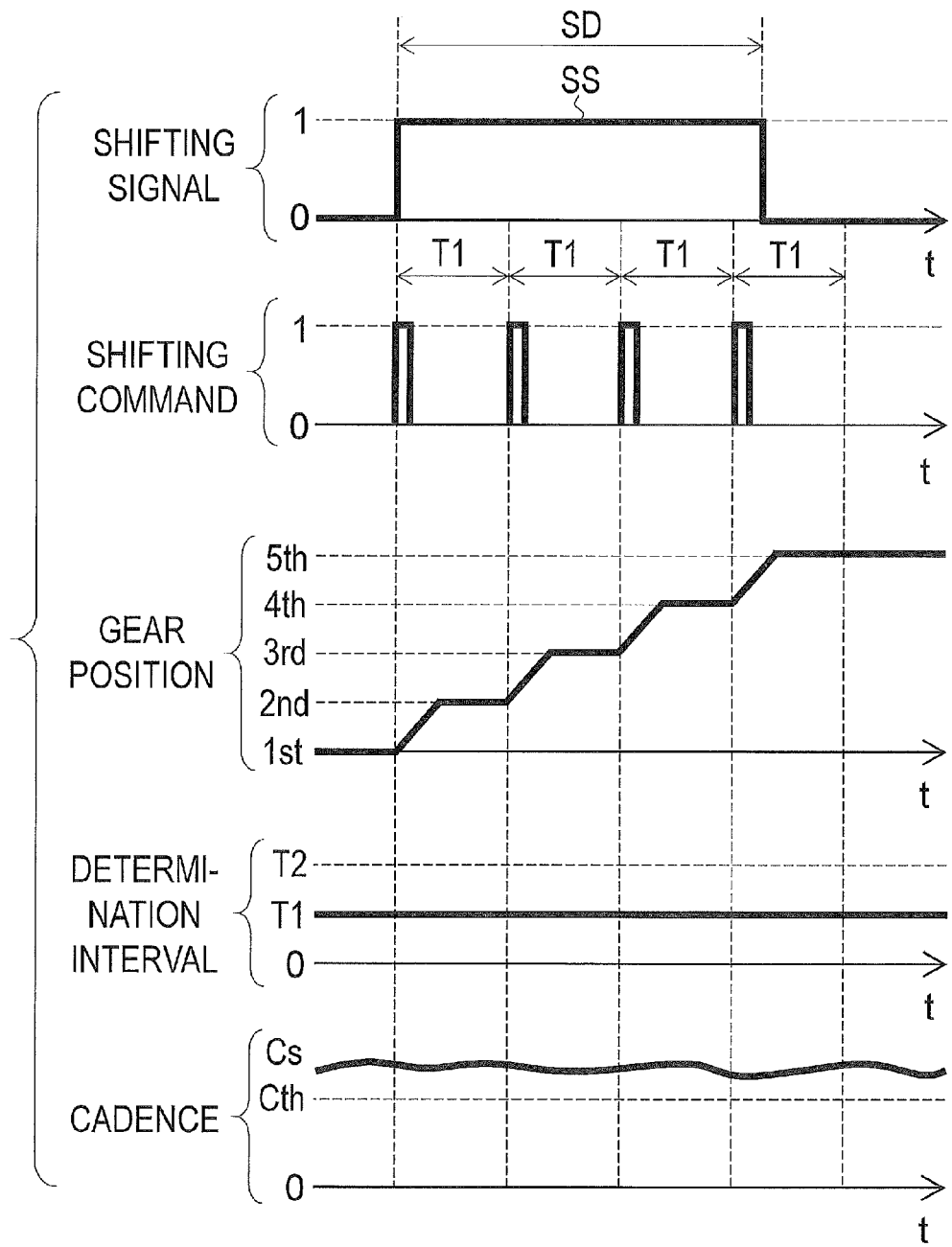
FIG. 11 is a timing chart showing an operation of the bicycle shifting control apparatus illustrated in FIG. 10.
Figure 12:
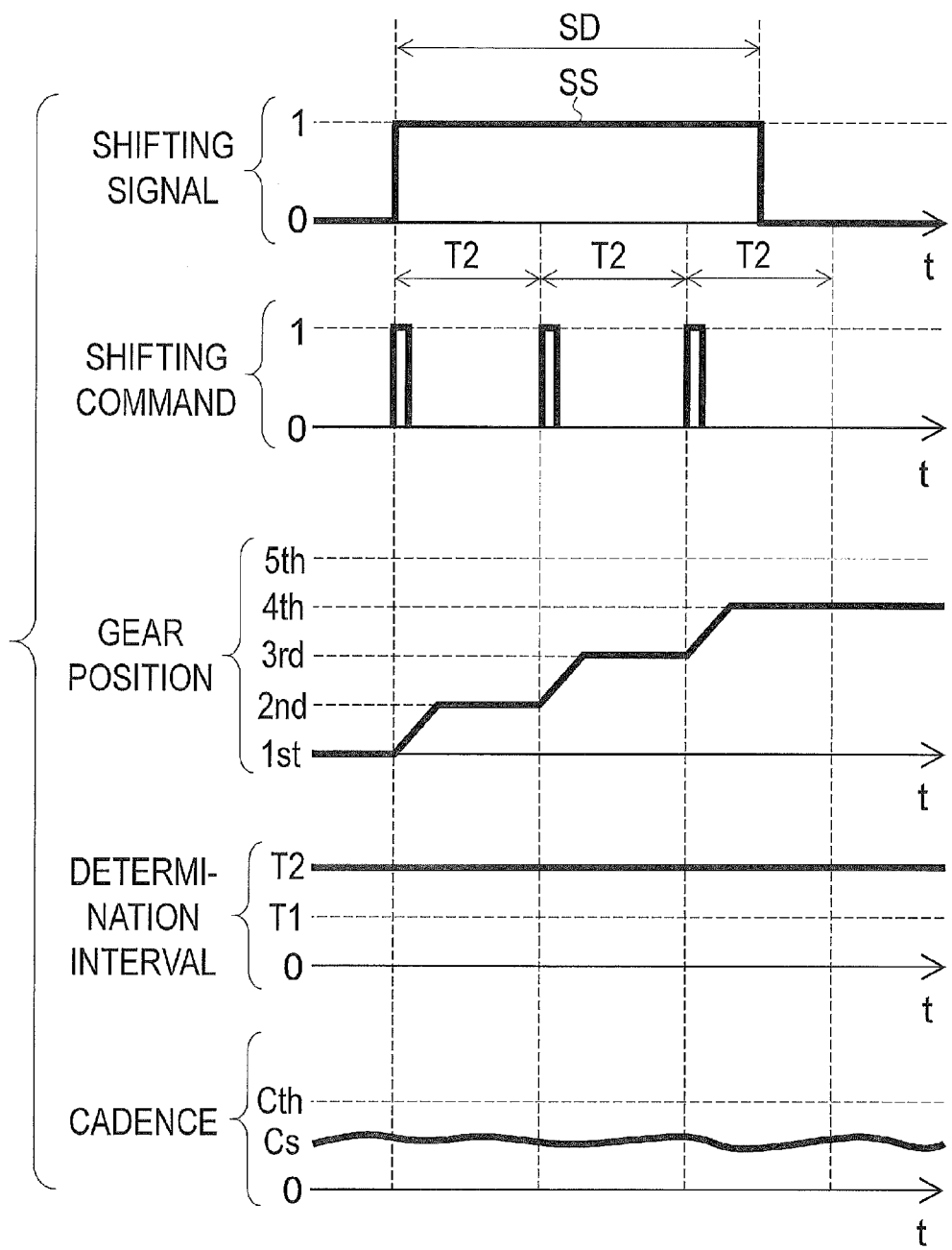
FIG. 12 is a timing chart showing the operation of the bicycle shifting control apparatus illustrated in FIG. 10.

As seen in FIGS. 11 and 12, the response-speed memory 428 is configured to store a first determination interval T1 and a second determination interval T2. The second determination interval T2 is longer than the first determination interval T1. For example, the first determination interval T1 is a normal determination interval of the bicycle transmission 9. The response-speed memory 428 can be configured to store more than three determination intervals if needed and/or desired.

As seen in FIG. 11, the response-speed selector 430 is configured to select the first determination interval T1 as the determination interval T0 from among the first determination interval T1 and the second determination interval T2 if the cadence Cs sensed by the cadence sensor 24 is equal to or higher than the cadence threshold Cth. The response-speed selector 430 outputs the first determination interval T1 to the transmission controller 14 as the response speed when selecting the first determination interval T1. The determination part 20 determines at the first determination interval T1 whether the shifting signals SS is continuous.

As seen in FIG. 12, the response-speed selector 430 is configured to select the second determination interval T2 as the determination interval T0 from among the first determination interval T1 and the second determination interval T2 if the cadence Cs sensed by the cadence sensor 24 is lower than the cadence threshold Cth. The response-speed selector 430 outputs the second determination interval T2 to the transmission controller 14 as the response speed when selecting the second determination interval T2. The determination part 20 determines at the second determination interval T2 whether the shifting signals SS is continuous.

In the illustrated embodiment, the response-speed selector 430 is configured to select one of the stored determination intervals as the determination interval T0 in accordance with the cadence Cs. However, the response-speed selector 430 can be configured to continuously change the determination interval T0 in accordance with the cadence Cs if needed and/or desired.

FIG. 11 is substantially the same as FIG. 3 except for the first determination interval T1. As seen in FIG. 11, in a state where the cadence Cs is equal to or higher than the cadence threshold Cth, the determination part 20 determines at the first determination interval T1 whether the shifting signal SS is continuous. When the determination part 20 of the transmission controller 14 determines at the first determination interval T1 that the shifting signal SS is continuous, the command generator 22 outputs an upshifting command to the bicycle transmission 9. The bicycle transmission 9 continuously changes the current gear position from the first gear to the fifth gear in response to the upshifting commands which are output from the command generator 22 during the signal duration SD of the shifting signal SS.

As seen in FIG. 12, in a state where the cadence Cs is lower than the cadence threshold Cth, the determination part 20 determines at the second determination interval T2 whether the shifting signal SS is continuous. When the determination part 20 of the transmission controller 14 determines at the second determination interval T2 that the shifting signal SS is continuous, the command generator 22 outputs an upshifting command to the bicycle transmission 9. The bicycle transmission 9 continuously changes the current gear position from the first gear to the fourth gear in response to the upshifting commands which are output from the command generator 22 during the signal duration SD of the shifting signal SS. Since the second determination interval T2 is longer than the first determination interval T1, the command generator 22 does not output an upshifting command to change the current gear position from the fourth gear to the fifth gear. The second determination interval T2 can reduce a total number of stages of the continuous gear changing.

With the bicycle shifting control apparatus 412, the speed changing part 416 is configured to change the response speed based on the pedaling state sensed by the sensing device 18. Accordingly, it is possible to change the response speed of the bicycle transmission 9 in accordance with the condition of the bicycle.

Fifth Embodiment

A bicycle shifting control apparatus 512 in accordance with a fifth embodiment will be described below referring to FIGS. 13 to 15. The bicycle shifting control apparatus 512 has the same configuration as the bicycle shifting control apparatus 12 except for the speed changing part and the sensing device. Thus, elements having substantially the same function as those in the above embodiments will be numbered the same here, and will not be described and/or illustrated again in detail here for the sake of brevity.

Figure 13:
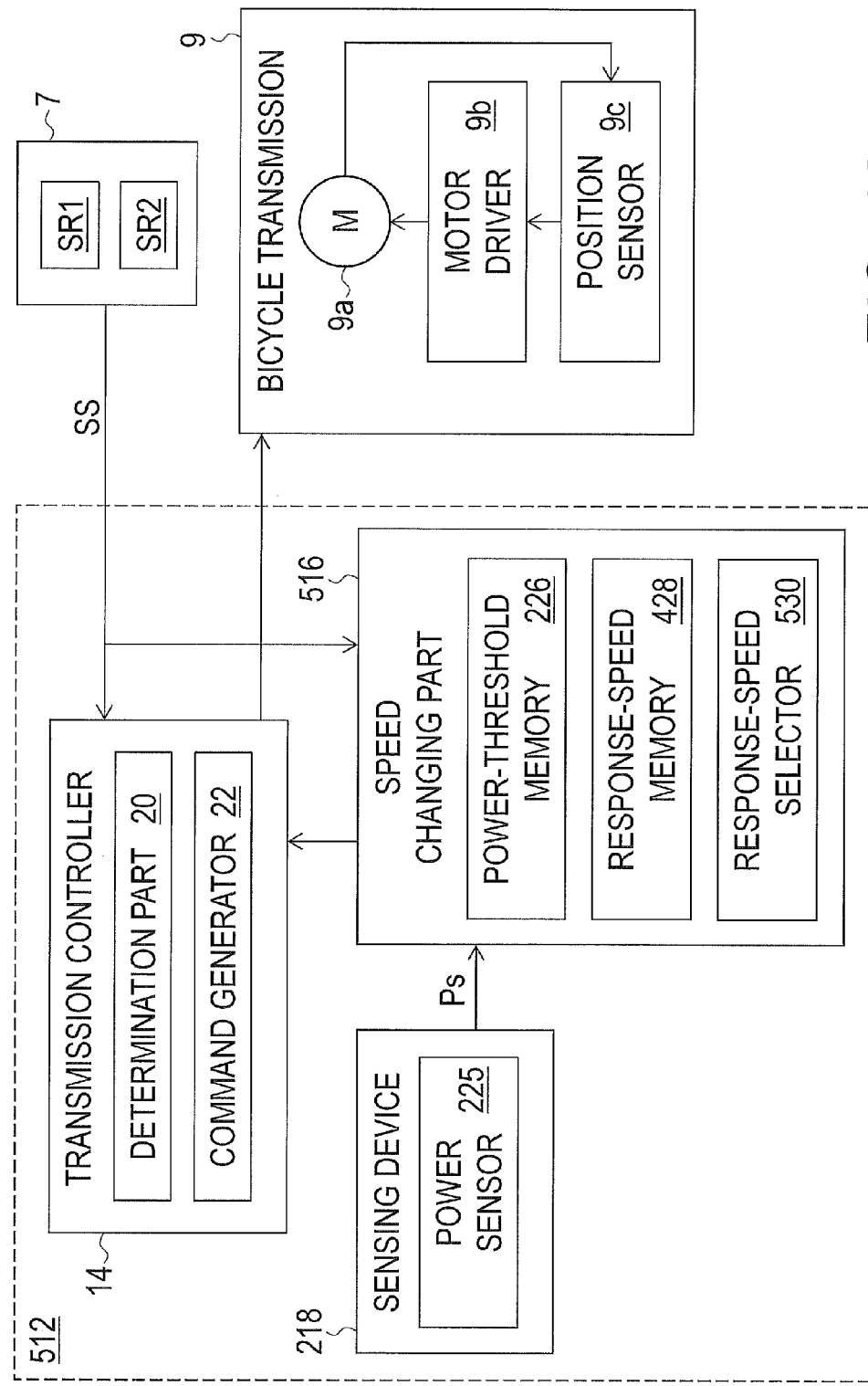
FIG. 13 is a block diagram of a bicycle shifting control apparatus in accordance with a fifth embodiment.

As seen in FIG. 13, the bicycle shifting control apparatus 512 comprises a speed changing part 516 configured to change one of the operating speed and the response speed based on the pedaling state sensed by the sensing device 18. In the illustrated embodiment, the speed changing part 516 is configured to change the determination interval T0 based on the pedaling power Ps sensed by the power sensor 225.

The speed changing part 16 increases the determination interval T0 if the pedaling power Ps sensed by the power sensor 225 is higher than the power threshold Pth. More specifically, the speed changing part 516 includes the power-threshold memory 226 and the response-speed memory 428.

As seen in FIG. 13, the speed changing part 516 includes a response-speed selector 530 configured to select, as the determination interval T0, one of the stored determination intervals if the pedaling power Ps sensed by the power sensor 225 is higher than the power threshold Pth. The response-speed selector 530 outputs the first determination interval T1 to the transmission controller 14 as the response speed when selecting the first determination interval T1. The determination part 20 determines at the first determination interval T1 whether the shifting signals SS is continuous.

In the illustrated embodiment, the response-speed selector 530 is configured to select one of the stored determination intervals as the determination interval T0 in accordance with the pedaling power Ps. However, the response-speed selector 530 can be configured to continuously change the determination interval T0 in accordance with the pedaling power Ps.

Figure 14:
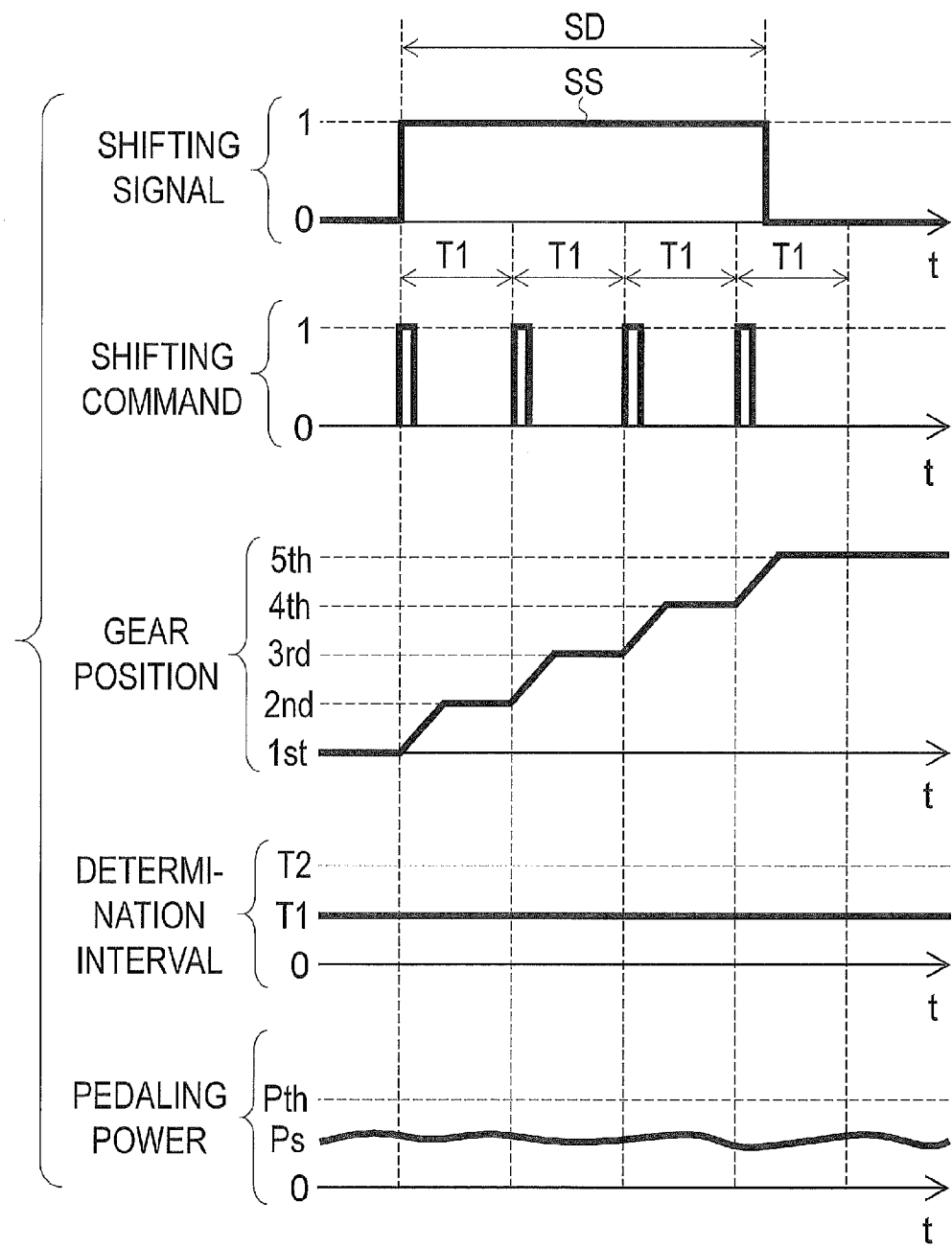
FIG. 14 is a timing chart showing an operation of the bicycle shifting control apparatus illustrated in FIG. 13.

As seen in FIG. 14, the response-speed selector 530 is configured to select the first determination interval T1 as the determination interval from among the first determination interval T1 and the second determination interval T2 if the pedaling power Ps sensed by the power sensor 225 is equal to or lower than the power threshold Pth stored in the power-threshold memory 226. The response-speed selector 530 outputs the first determination interval T1 to the transmission controller 14 as the response speed when selecting the first determination interval T1. The determination part 20 determines at the first determination interval T1 whether the shifting signals SS is continuous.

Figure 15:
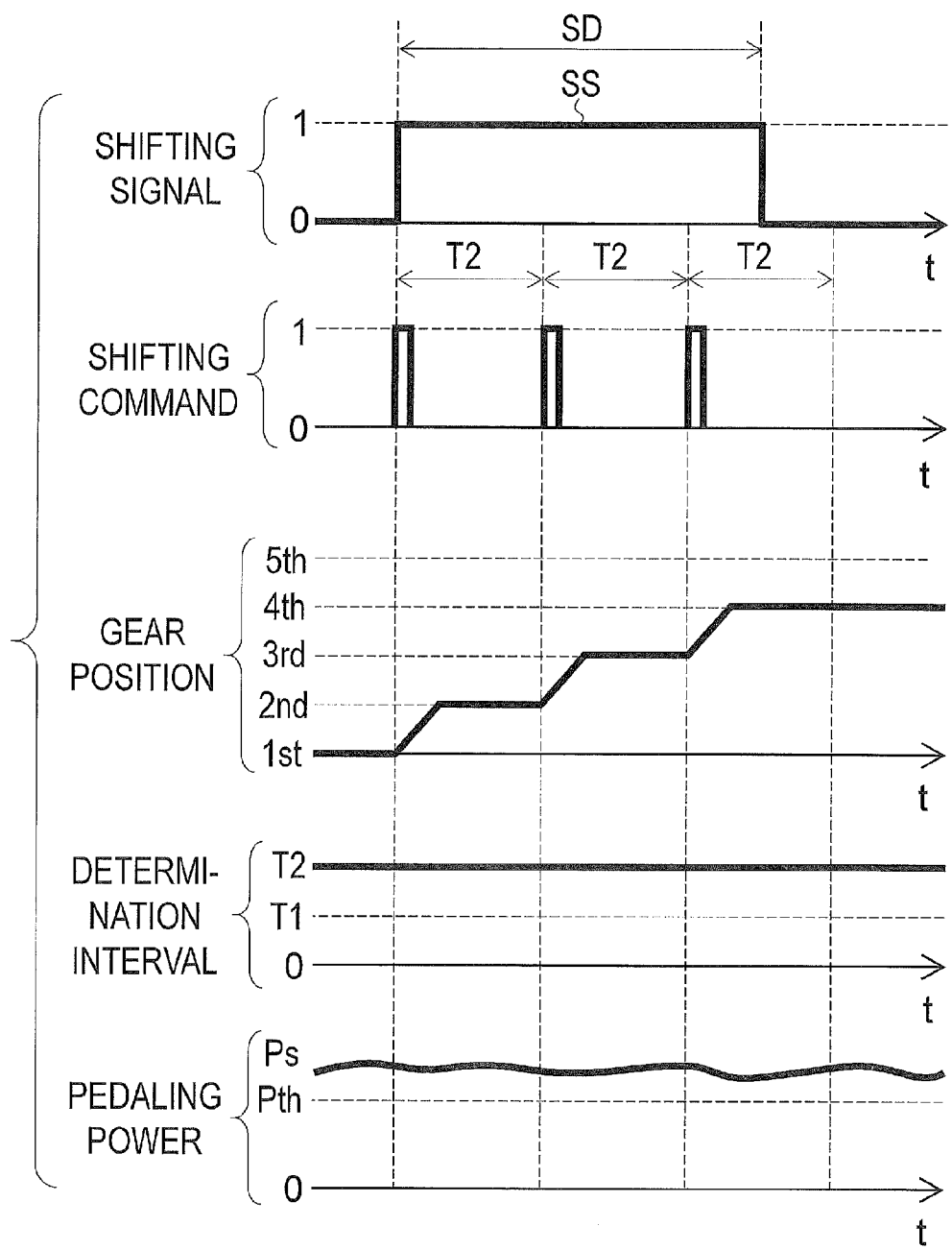
FIG. 15 is a timing chart showing the operation of the bicycle shifting control apparatus illustrated in FIG. 13.

As seen in FIG. 15, the response-speed selector 530 is configured to select the second determination interval T2 as the determination interval T0 from among the first determination interval T1 and the second determination interval T2 if the pedaling power Ps sensed by the power sensor 225 is higher than the power threshold Pth stored in the power-threshold memory 226. The response-speed selector 530 outputs the second determination interval T2 to the transmission controller 14 as the response speed when selecting the second determination interval T2. The determination part 20 determines at the second determination interval T2 whether the shifting signals SS is continuous.

FIG. 14 is substantially the same as FIG. 11 except for the pedaling power Ps. FIG. 15 is substantially the same as FIG. 12 except for the pedaling power Ps. Accordingly, the operations shown in FIGS. 14 and 15 will not be described in detail here for the sake of brevity.

With the bicycle shifting control apparatus 512, the speed changing part 516 is configured to change the response speed based on the pedaling state sensed by the sensing device 18. Accordingly, it is possible to change the response speed of the bicycle transmission 9 in accordance with the condition of the bicycle.

Sixth Embodiment

A bicycle shifting control apparatus 612 in accordance with a sixth embodiment will be described below referring to FIGS. 16 and 17. The bicycle shifting control apparatus 612 has the same configuration as the bicycle shifting control apparatus 12 except for the transmission controller. Thus, elements having substantially the same function as those in the above embodiments will be numbered the same here, and will not be described and/or illustrated again in detail here for the sake of brevity.

Figure 16:
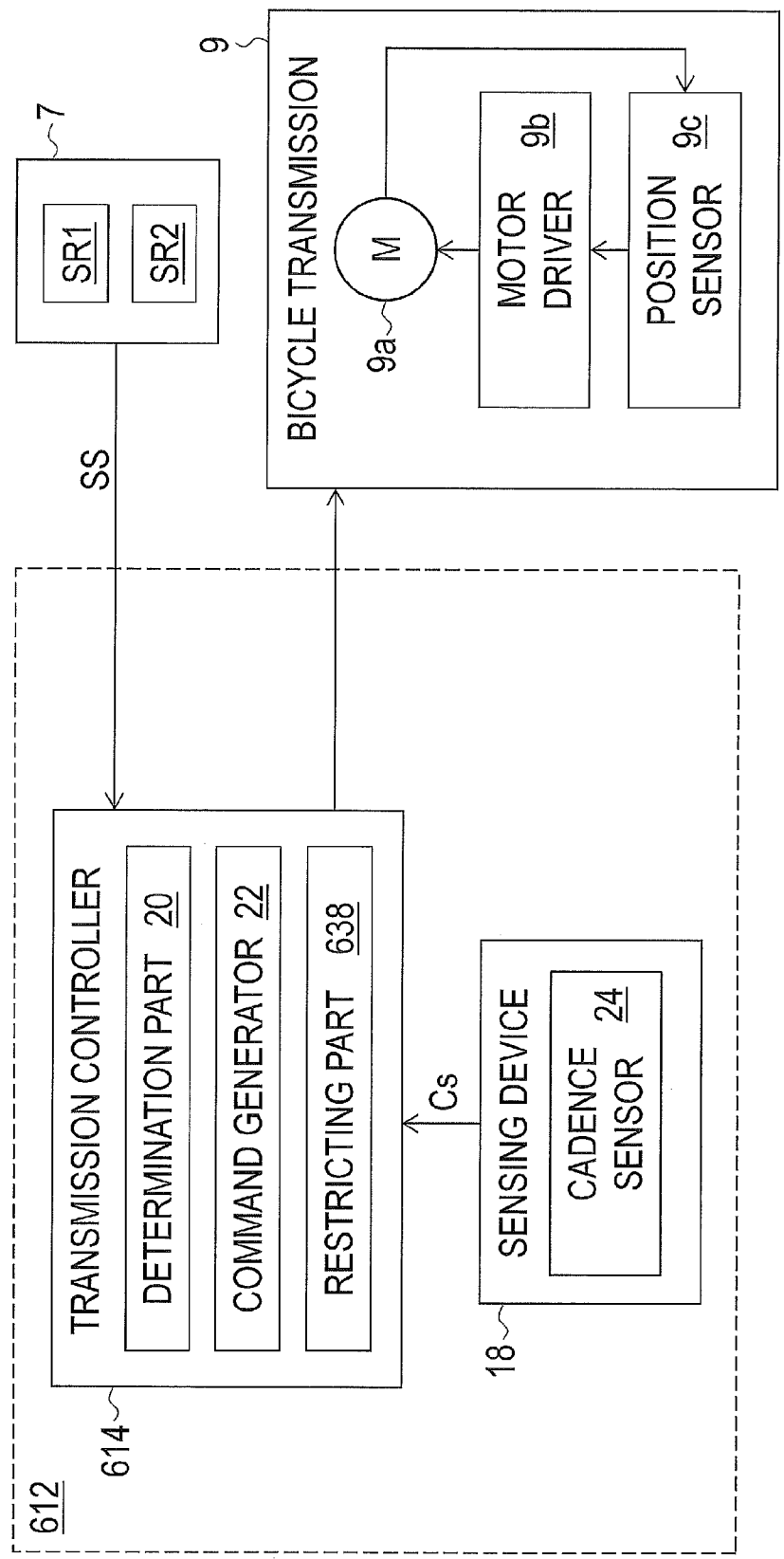
FIG. 16 is a block diagram of a bicycle shifting control apparatus in accordance with a sixth embodiment.

As seen in FIG. 16, the bicycle shifting control apparatus 612 comprises the sensing device 18 and a transmission controller 614. The transmission controller 614 is configured to control the bicycle transmission 9 to continuously change a current gear position among a plurality of gear positions based on the shifting signal SS which has the signal duration SD and which is output from the shifter 7. The transmission controller 614 includes the determination part 20, the command generator 22, and a restricting part 638. Unlike the bicycle shifting control apparatus 12 in accordance with the first embodiment, the speed changing part is omitted from the bicycle shifting control apparatus 612.

The restricting part 638 is configured to restrict the bicycle transmission 9 from continuously changing the current gear position based on the pedaling state sensed by the sensing device 18. In the illustrated embodiment, the restricting part 638 is configured to restrict the bicycle transmission 9 from continuously changing the current gear position if the cadence Cs sensed by the cadence sensor 24 is lower than the cadence threshold Cth. More specifically, the restricting part 638 is configured to restrict the command generator 22 from outputting the shifting command to the bicycle transmission 9 if the cadence Cs sensed by the cadence sensor 24 is lower than the cadence threshold Cth.

Figure 17:
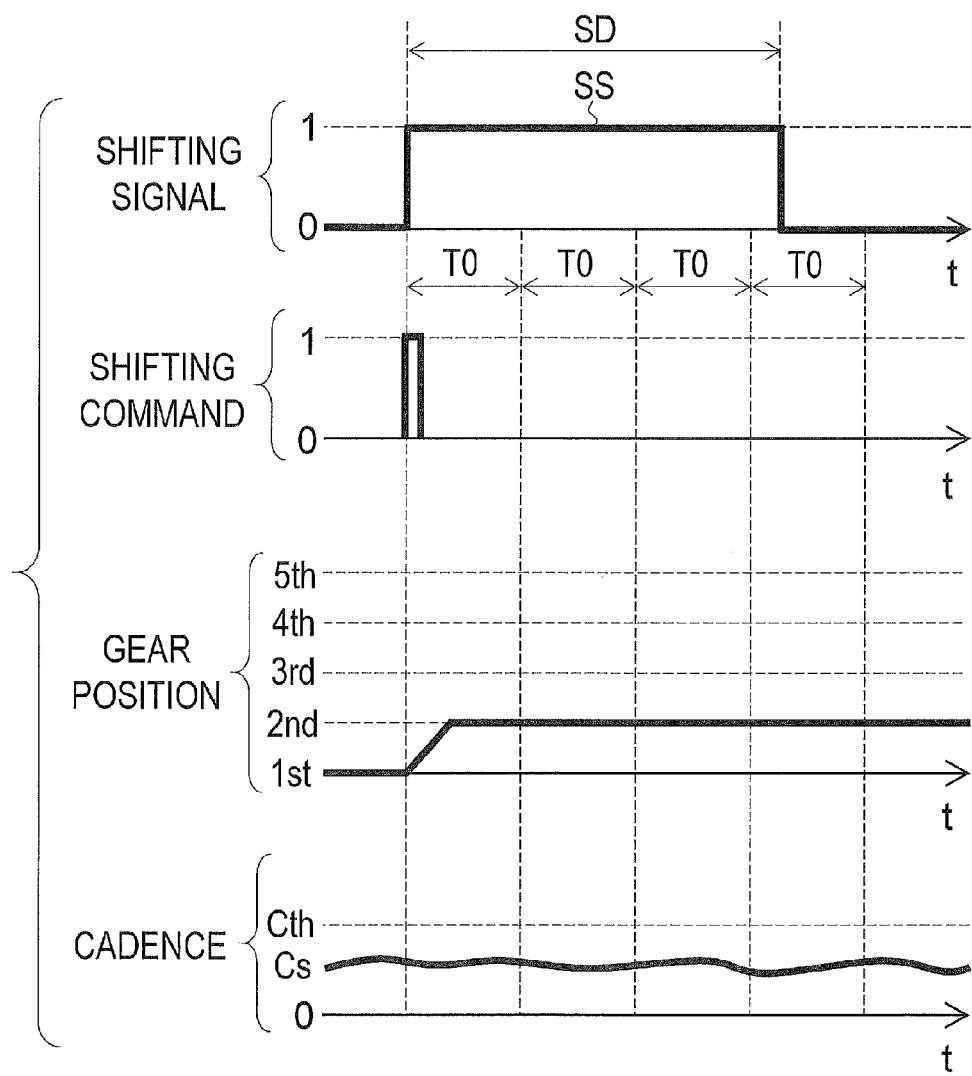
FIG. 17 is a timing chart showing an operation of the bicycle shifting control apparatus illustrated in FIG. 16.

As seen in FIG. 17, for example, in a state where the cadence Cs is lower than the cadence threshold Cth, the restricting part 638 restricts the bicycle transmission 9 from continuously changing the current gear position based on the pedaling state sensed by the sensing device 18 even if the determination part 20 determines at the next determination interval T0 that the shifting signal SS is still continuous. More specifically, in a state where the cadence Cs is lower than the cadence threshold Cth, the restricting part 638 restricts the command generator 22 from outputting the additional upshifting commands to the bicycle transmission 9 even if the determination part 20 determines at the next determination interval T0 that the shifting signal SS is still continuous. This restricts the bicycle transmission 9 from continuously changing the current gear position from the second gear to the fifth gear. Accordingly, the bicycle transmission 9 is prevented from continuously changing the current gear position in the state where the cadence Cs is lower than the cadence threshold Cth.

On the other hand, as seen in FIG. 3, in a state where the cadence Cs is equal to or higher than the cadence threshold Cth, the restricting part 638 allows the bicycle transmission 9 to continuously change the current gear position. More specifically, in the state where the cadence Cs is equal to or higher than the cadence threshold Cth, the restricting part 638 allows the command generator 22 to output the additional upshifting commands to the bicycle transmission 9 if the determination part 20 determines at the next determination interval T0 that the shifting signal SS is still continuous. This allows the bicycle transmission 9 to continuously change the current gear position from the second gear to the fifth gear as well as the first embodiment.

With the bicycle shifting control apparatus 612, the restricting part 638 is configured to restrict the bicycle transmission 9 from continuously changing the current gear position based on the pedaling state sensed by the sensing device 18. Accordingly, in the bicycle transmission 9, it is possible to reduce damage caused by the continuous gear changing in accordance with the pedaling state.

Seventh Embodiment

A bicycle shifting control apparatus 712 in accordance with a seventh embodiment will be described below referring to FIGS. 18 and 19. The bicycle shifting control apparatus 712 has the same configuration as the bicycle shifting control apparatus 612 except for the sensing device. Thus, elements having substantially the same function as those in the above embodiments will be numbered the same here, and will not be described and/or illustrated again in detail here for the sake of brevity.

Figure 18:
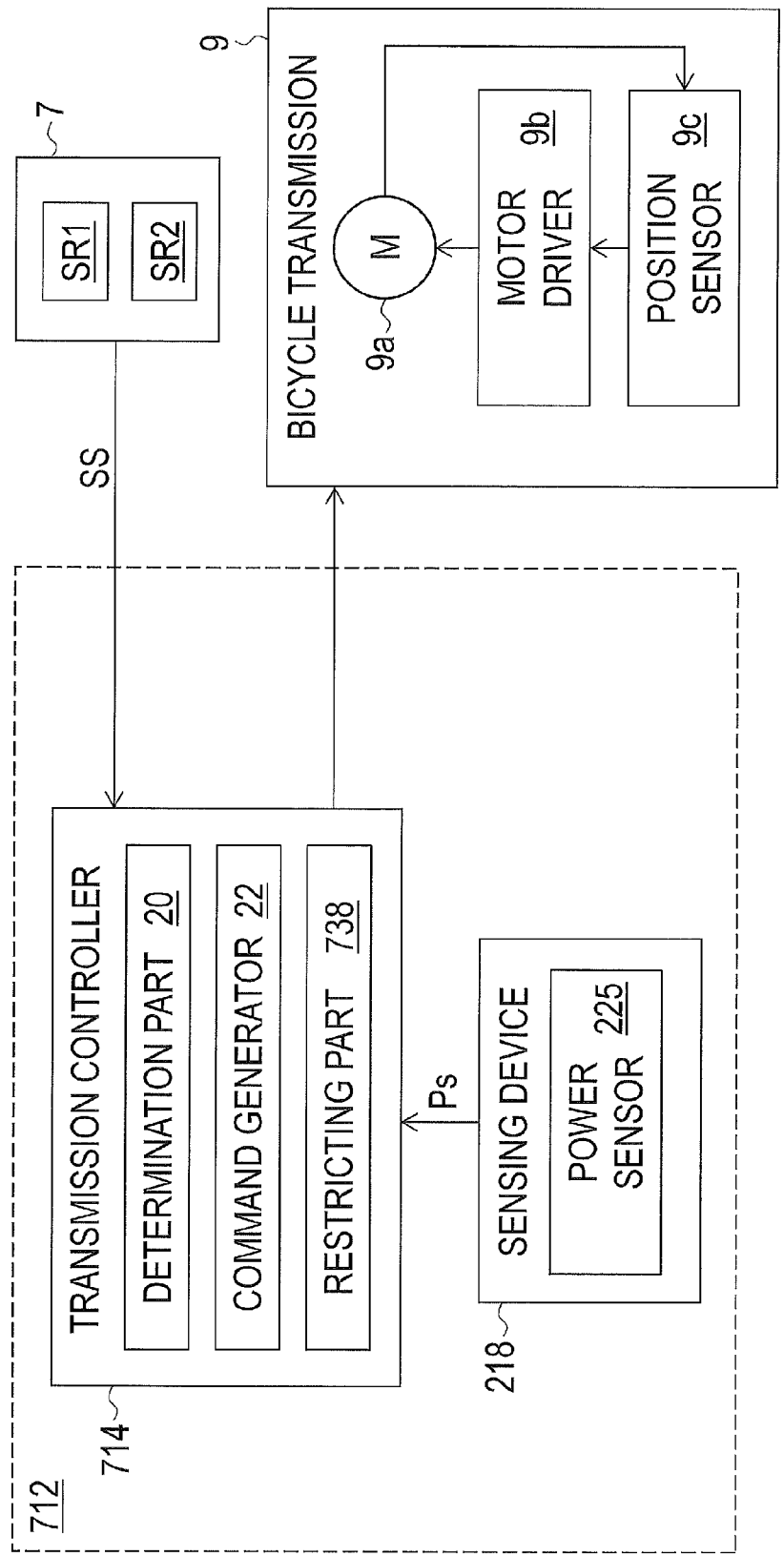
FIG. 18 is a block diagram of a bicycle shifting control apparatus in accordance with a seventh embodiment.

As seen in FIG. 18, the bicycle shifting control apparatus 712 comprises the sensing device 218 and a transmission controller 714. The transmission controller 714 is configured to control the bicycle transmission 9 to continuously change a current gear position among a plurality of gear positions based on the shifting signal SS which has the signal duration SD and which is output from the shifter 7. The transmission controller 714 includes the determination part 20, the command generator 22, and a restricting part 738.

The restricting part 738 is configured to restrict the bicycle transmission 9 from continuously changing the current gear position based on the pedaling state sensed by the sensing device 218. In the illustrated embodiment, the restricting part 738 is configured to restrict the bicycle transmission 9 from continuously changing the current gear position if the pedaling power Ps sensed by the power sensor 225 is higher than the power threshold Pth. More specifically, the restricting part 738 is configured to restrict the command generator 22 from outputting the shifting command to the bicycle transmission 9 if the pedaling power Ps sensed by the power sensor 225 is higher than the power threshold Pth.

Figure 19:
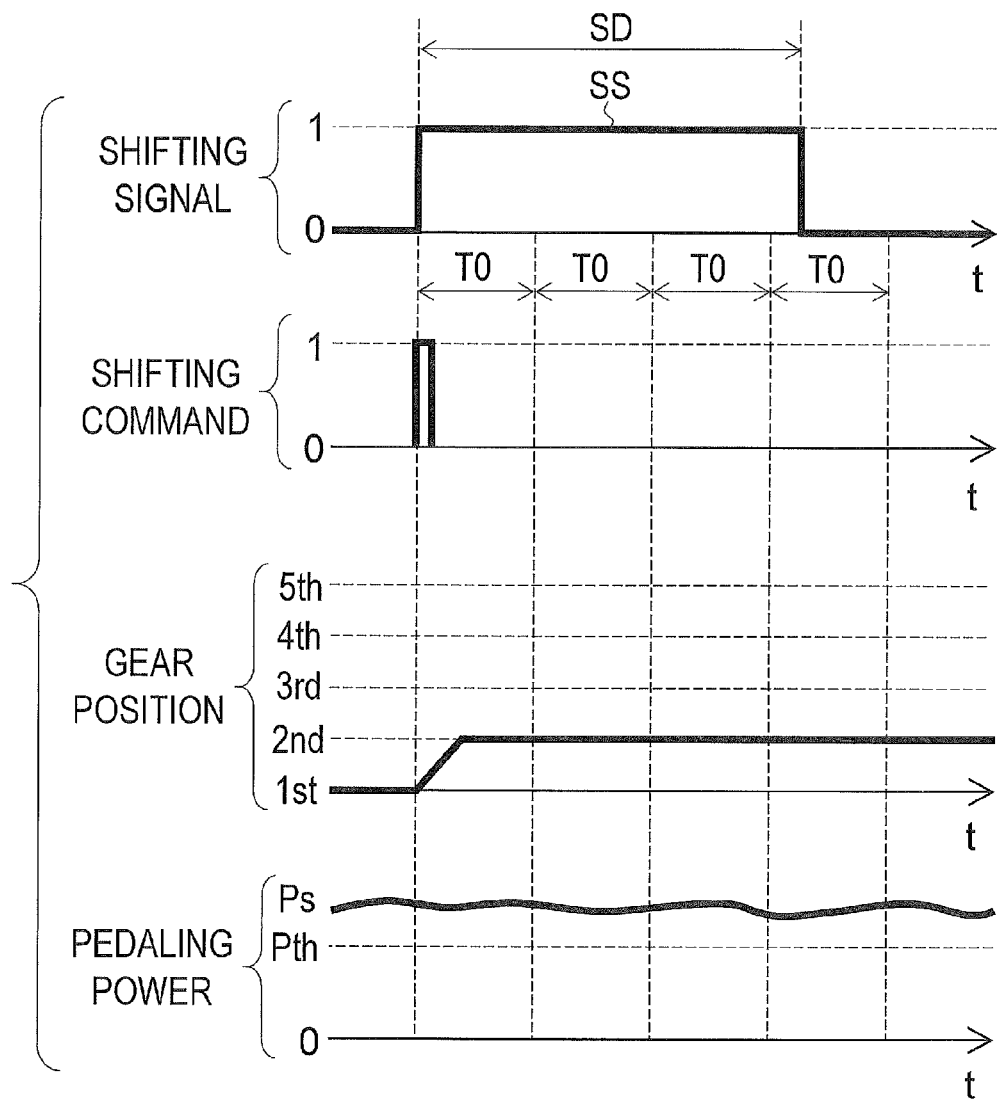
FIG. 19 is a timing chart showing an operation of the bicycle shifting control apparatus illustrated in FIG. 18.

As seen in FIG. 19, for example, in a state where the pedaling power Ps is higher than the power threshold Pth, the restricting part 738 restricts the bicycle transmission 9 from continuously changing the current gear position based on the pedaling state sensed by the sensing device 18 even if the determination part 20 determines at the next determination interval T0 that the shifting signal SS is still continuous. More specifically, in a state where the pedaling power Ps is higher than the power threshold Pth, the restricting part 738 restricts the command generator 22 from outputting the additional upshifting commands to the bicycle transmission 9 even if the determination part 20 determines at the next determination interval T0 that the shifting signal SS is still continuous. This restricts the bicycle transmission 9 from continuously changing the current gear position from the second gear to the fifth gear. Accordingly, the bicycle transmission 9 is prevented from continuously changing the current gear position in the state where the pedaling power Ps is lower than the power threshold Pth.

On the other hand, as seen in FIG. 7, in a state where the pedaling power Ps is equal to or lower than the power threshold Pth, the restricting part 738 allows the bicycle transmission 9 to continuously change the current gear position. More specifically, in the state where the pedaling power Ps is equal to or lower than the power threshold Pth, the restricting part 738 allows the command generator 22 to output the additional upshifting commands to the bicycle transmission 9 if the determination part 20 determines at the next determination interval T0 that the shifting signal SS is still continuous. This allows the bicycle transmission 9 to continuously change the current gear position from the second gear to the fifth gear as well as the second embodiment.

With the bicycle shifting control apparatus 712, the restricting part 738 is configured to restrict the bicycle transmission 9 from continuously changing the current gear position based on the pedaling state sensed by the sensing device 18. Accordingly, in the bicycle transmission 9, it is possible to reduce damage caused by the continuous gear changing in accordance with the pedaling state.

Eighth Embodiment

A bicycle shifting control apparatus 812 in accordance with an eighth embodiment will be described below referring to FIGS. 20 to 23. Elements having substantially the same function as those in the above embodiments will be numbered the same here, and will not be described and/or illustrated again in detail here for the sake of brevity.

Figure 20:
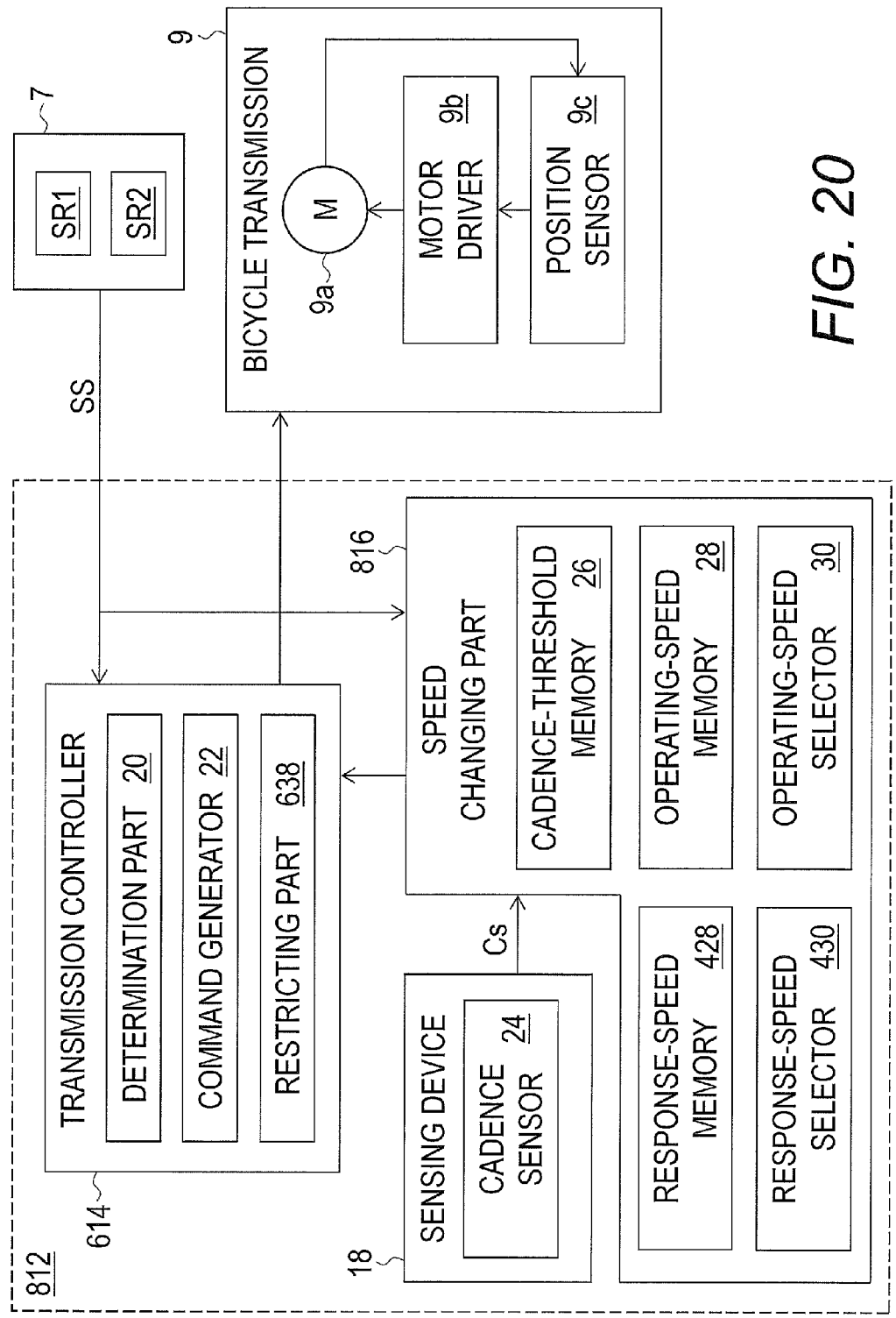
FIG. 20 is a block diagram of a bicycle shifting control apparatus in accordance with an eighth embodiment.

As seen in FIG. 20, the bicycle shifting control apparatuses 12, 412, and 612 in accordance with the first, fourth, and sixth embodiments are combined to provide the bicycle shifting control apparatus 812. More specifically, the bicycle shifting control apparatus 812 comprises the transmission controller 614, the speed changing part 816, and the sensing device 18. The speed changing part 816 includes the cadence-threshold memory 26, the operating-speed memory 28, the operating-speed selector 30, the response-speed memory 428, and the response-speed selector 430. The cadence-threshold memory 26 is configured to store the cadence threshold Cth1 (FIG. 21).

Figure 21:
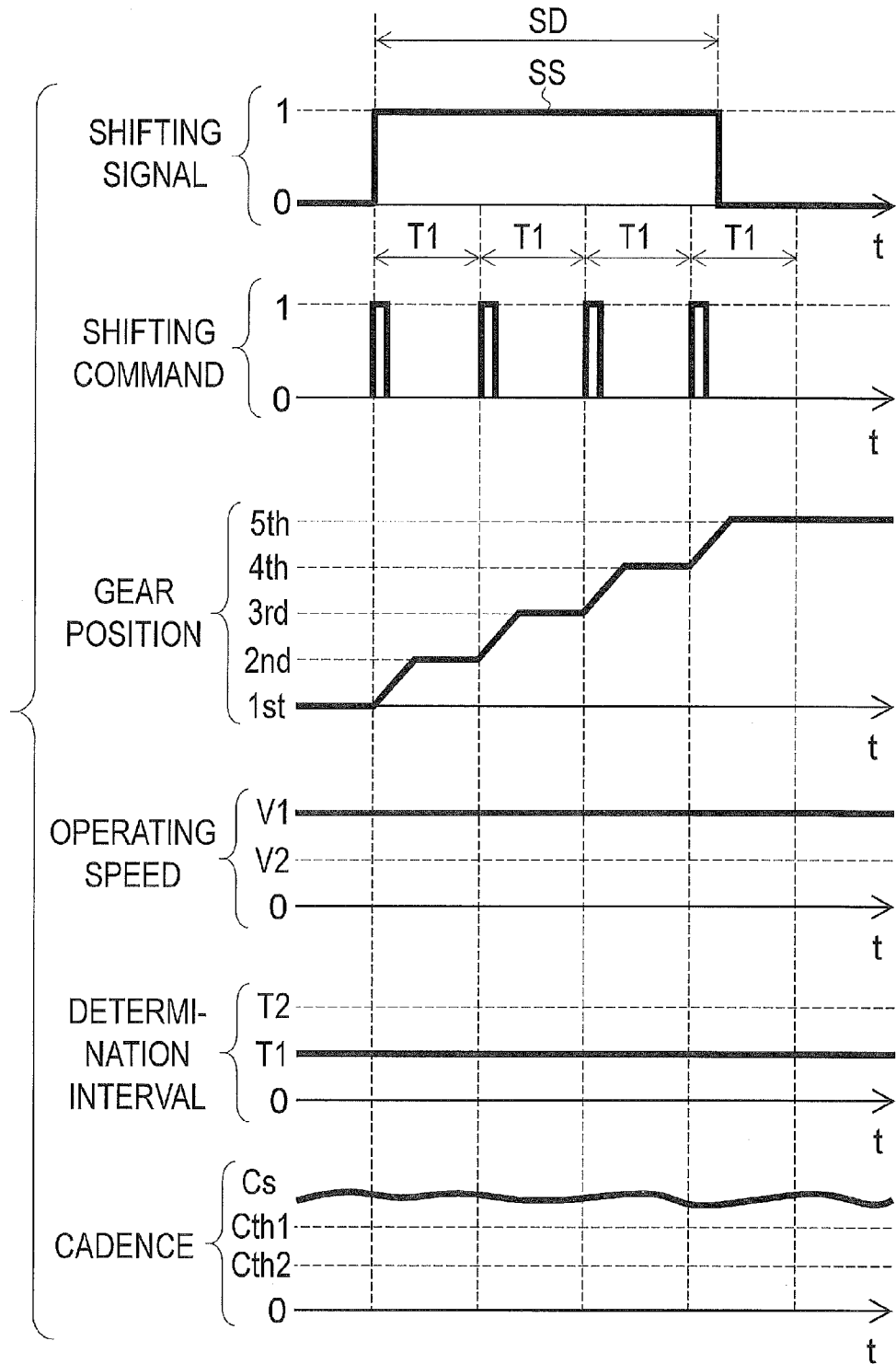
FIG. 21 is a timing chart showing an operation of the bicycle shifting control apparatus illustrated in FIG. 20.

In the illustrated embodiment, the restricting part 638 is configured to restrict the bicycle transmission 9 from continuously changing the current gear position if the cadence Cs sensed by the cadence sensor 24 is lower than the cadence threshold Cth2 (FIG. 21). The cadence threshold Cth2 is lower than the cadence threshold Cth1 stored in the cadence-threshold memory 26.

As seen in FIG. 21, the operating-speed selector 30 is configured to select the first operating speed V1 as the operating speed from among the first operating speed V1 and the second operating speed V2 if the cadence Cs sensed by the cadence sensor 24 is equal to or higher than the cadence threshold Cth1. The response-speed selector 430 is configured to select the first determination interval T1 as the determination interval T0 from among the first determination interval T1 and the second determination interval T2 if the cadence Cs sensed by the cadence sensor 24 is equal to or higher than the cadence threshold Cth1.

Figure 22:
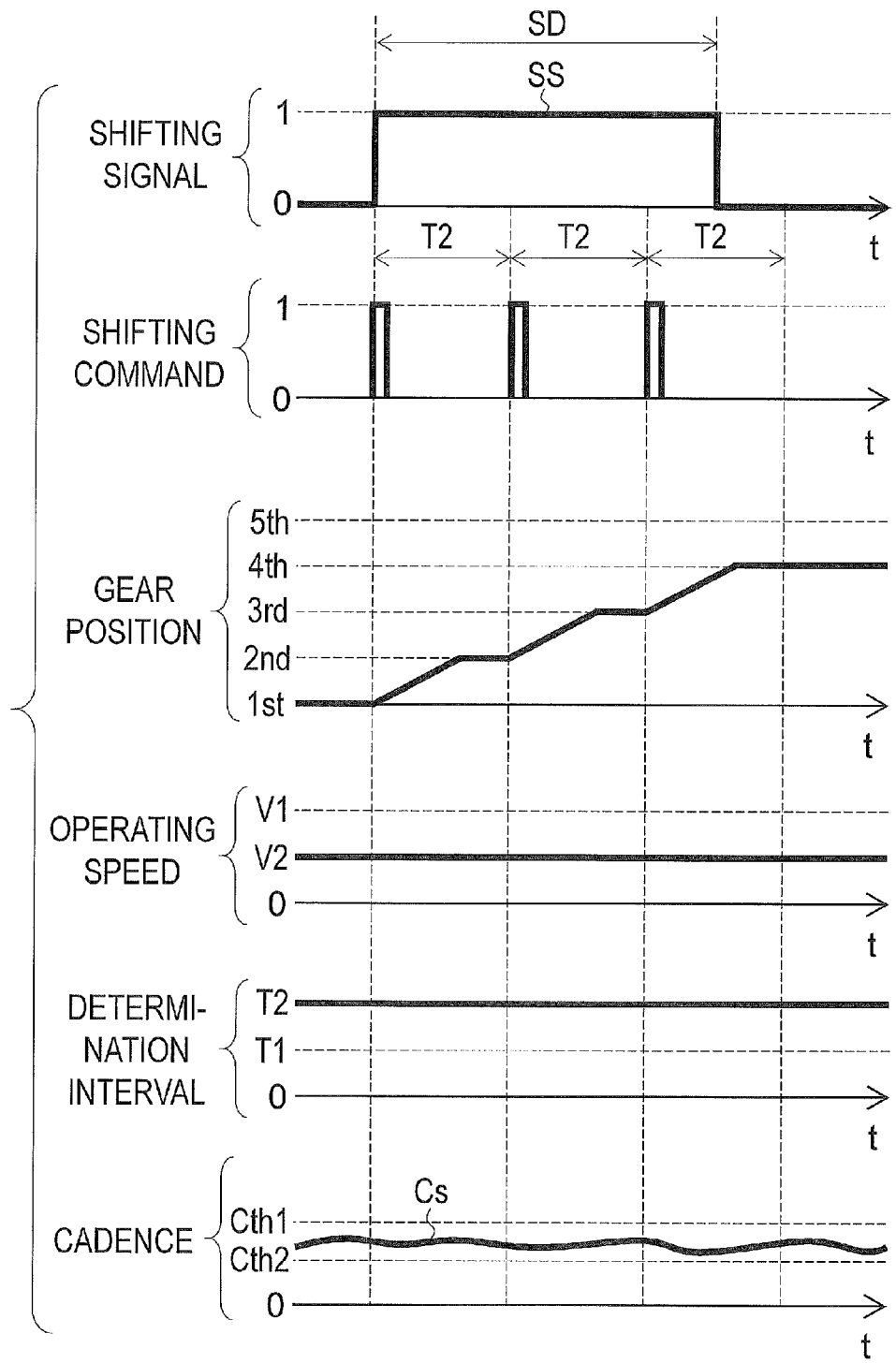
FIG. 22 is a timing chart showing the operation of the bicycle shifting control apparatus illustrated in FIG. 20.

As seen in FIG. 22, the operating-speed selector 30 is configured to select the second operating speed V2 as the operating speed from among the first operating speed V1 and the second operating speed V2 if the cadence Cs sensed by the cadence sensor 24 is lower than the cadence threshold Cth1. The response-speed selector 430 is configured to select the second determination interval T2 as the determination interval T0 from among the first determination interval T1 and the second determination interval T2 if the cadence Cs sensed by the cadence sensor 24 is lower than the cadence threshold Cth1.

As seen in FIGS. 21 and 22, in a state where the cadence Cs is equal to or higher than the cadence threshold Cth2, the restricting part 638 allows the bicycle transmission 9 to continuously change the current gear position.

Figure 23:
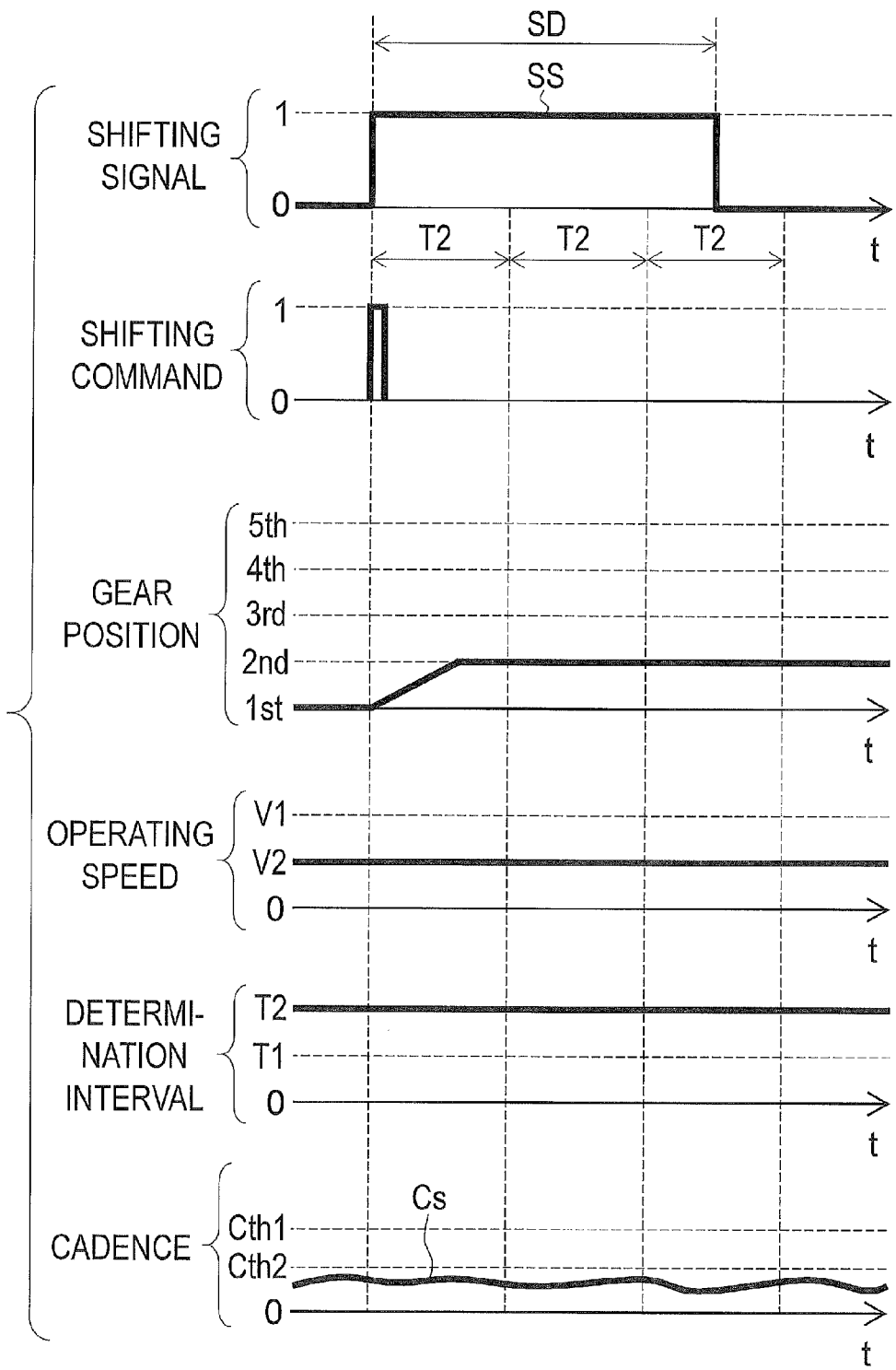
FIG. 23 is a timing chart showing the operation of the bicycle shifting control apparatus illustrated in FIG. 20.

As seen in FIG. 23, in a state where the cadence Cs is lower than the cadence threshold Cth2, the restricting part 638 restricts the bicycle transmission 9 from continuously changing the current gear position based on the pedaling state sensed by the sensing device 18 even if the determination part 20 determines at the next determination interval T0 that the shifting signal SS is still continuous.

As described in the eighth embodiment, it will be apparent to those skilled in the bicycle field from the present disclosure that the configurations of the above embodiments can be combined if needed and/or desired. For example, the bicycle shifting control apparatuses 212, 512, and 712 in accordance with the second, fifth, and seventh embodiments can be combined to provide another bicycle shifting control apparatus as well as the bicycle shifting control apparatus 812 in accordance with the eighth embodiment.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle shifting control apparatus comprising:
    a transmission controller configured to control a bicycle transmission with an operating speed; and
    a speed changing part configured to change the operating speed of the bicycle transmission based on input information, the operating speed comprising a speed with which an actuator of the bicycle transmission moves a guide member of the bicycle transmission.
2. The bicycle shifting control apparatus according to claim 1, further comprising:
    a sensing device configured to sense a pedaling state of a bicycle as the input information, wherein
    the speed changing part is configured to change the operating speed of the bicycle transmission based on the pedaling state sensed by the sensing device.
3. The bicycle shifting control apparatus according to claim 2, wherein
    the sensing device comprises a cadence sensor configured to sense a cadence of the bicycle, and
    the speed changing part is configured to change the operating speed of the bicycle transmission based on the cadence sensed by the cadence sensor.
4. The bicycle shifting control apparatus according to claim 2, wherein
    the sensing device comprises a power sensor configured to sense a pedaling power applied to a crank assembly of the bicycle, and
    the speed changing part is configured to change the operating speed of the bicycle transmission based on the pedaling power sensed by the power sensor.
5. The bicycle shifting control apparatus according to claim 1, wherein
    the speed changing part includes an operating-speed receiving part configured to receive an input operating speed as the input information from an input device, and
    the speed changing part is configured to change the operating speed of the bicycle transmission based on the input operating speed received by the operating-speed receiving part.
6. A bicycle shifting control apparatus comprising:
    a transmission controller configured to control a bicycle transmission with an operating speed and a response speed;
    a sensing device configured to sense a pedaling state of a bicycle; and
    a speed changing part configured to change one of the operating speed and the response speed based on the pedaling state sensed by the sensing device, the operating speed comprising a speed with which an actuator of the bicycle transmission moves a guide member of the bicycle transmission, the response speed comprising a determination interval of the transmission controller.
7. The bicycle shifting control apparatus according to claim 6, wherein
    the sensing device comprises a cadence sensor configured to sense a cadence of the bicycle, and
    the speed changing part is configured to change the operating speed of the bicycle transmission based on the cadence sensed by the cadence sensor.
8. The bicycle shifting control apparatus according to claim 7, wherein
    the speed changing part decreases the operating speed of the bicycle transmission if the cadence sensed by the cadence sensor is lower than a cadence threshold.
9. The bicycle shifting control apparatus according to claim 6, wherein
    the sensing device comprises a power sensor configured to sense a pedaling power applied to a crank assembly of the bicycle, and
    the speed changing part is configured to change the operating speed of the bicycle transmission based on the pedaling power sensed by the power sensor.
10. The bicycle shifting control apparatus according to claim 9, wherein
    the speed changing part decreases the operating speed of the bicycle transmission if the pedaling power sensed by the power sensor is higher than a power threshold.
11. The bicycle shifting control apparatus according to claim 6, wherein
    the transmission controller is configured to control the bicycle transmission to continuously change a current gear position among a plurality of gear positions based on a shifting signal which has a signal duration and which is output from a shifter.

12. A bicycle shifting control apparatus comprising:
a transmission controller configured to control a bicycle transmission with an operating speed and a response speed;
a sensing device configured to sense a pedaling state of a bicycle; and
a speed changing part configured to change one of the operating speed and the response speed based on the pedaling state sensed by the sensing device,
the transmission controller being configured to control the bicycle transmission to continuously change a current gear position among a plurality of gear positions based on a shifting signal which has a signal duration and which is output from a shifter,
the response speed of the bicycle transmission comprising a determination interval, and
the transmission controller including
a determination part configured to determine at the determination interval whether the shifting signal is continuous, and
a command generator configured to output a shifting command to the bicycle transmission at the determination interval if the determination part determines at the determination interval that the shifting signal is continuous.

13. The bicycle shifting control apparatus according to claim 12, wherein
the sensing device comprises a cadence sensor configured to sense a cadence of the bicycle, and
the speed changing part is configured to change the determination interval based on the cadence sensed by the cadence sensor.

14. The bicycle shifting control apparatus according to claim 13, wherein
the speed changing part increases the determination interval if the cadence sensed by the cadence sensor is lower than a cadence threshold.

15. The bicycle shifting control apparatus according to claim 12, wherein
the sensing device comprises a power sensor configured to sense a pedaling power applied to a crank assembly of the bicycle, and
the speed changing part is configured to change the determination interval based on the pedaling power sensed by the power sensor.

16. The bicycle shifting control apparatus according to claim 15, wherein
the speed changing part increases the determination interval if the pedaling power sensed by the power sensor is higher than a power threshold.

17. A bicycle shifting control apparatus comprising:
a sensing device configured to sense a pedaling state of a bicycle; and
a transmission controller configured to control a bicycle transmission to continuously change a current gear position among a plurality of gear positions based on a shifting signal which has a signal duration and which is output from a shifter, the transmission controller including a restricting part configured to restrict the bicycle transmission from continuously changing the current gear position based on the pedaling state sensed by the sensing device.

18. The bicycle shifting control apparatus according to claim 17, wherein
the sensing device comprises a cadence sensor configured to sense a cadence of the bicycle, and
the restricting part is configured to restrict the bicycle transmission from continuously changing the current gear position if the cadence sensed by the cadence sensor is lower than a cadence threshold.

19. The bicycle shifting control apparatus according to claim 17, wherein
the sensing device comprises a power sensor configured to sense a pedaling power applied to a crank assembly of the bicycle, and
the restricting part is configured to restrict the bicycle transmission from continuously changing the current gear position if the pedaling power sensed by the power sensor is higher than a power threshold.

* * * * *